US012325113B2

(12) United States Patent
MacKarvich

(10) Patent No.: US 12,325,113 B2
(45) Date of Patent: Jun. 10, 2025

(54) CLAMP ASSEMBLY FOR FALL PROTECTION REINFORCEMENT POST

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 18/929,242

(22) Filed: Oct. 28, 2024

(65) Prior Publication Data

US 2025/0153312 A1 May 15, 2025

(51) Int. Cl.

*B25B 5/10* (2006.01)
*A62B 35/00* (2006.01)
*E04G 21/32* (2006.01)
*E04H 17/10* (2006.01)

(52) U.S. Cl.

CPC .......... *B25B 5/109* (2013.01); *A62B 35/0068* (2013.01); *E04G 21/3242* (2013.01); *E04H 17/10* (2013.01); *E04H 17/124* (2021.01); *A62B 35/0056* (2013.01)

(58) Field of Classification Search

CPC ....... E04H 17/10; E04H 17/12; E04H 17/124; B25B 5/109; A62B 35/0056; A62B 35/0068; E04G 21/3219; E04G 21/3223; E04G 21/3233; E04G 21/3242

See application file for complete search history.

(56) References Cited

U.S. PATENT DOCUMENTS 346,644 A 8/1886 Crisp
361,001 A 4/1887 Devens
362,911 A 5/1887 Vanover
380,627 A 4/1888 Harmon et al.
406,642 A 7/1889 Frost
412,766 A 10/1889 Lounsberry
432,930 A 7/1890 Bond
448,030 A 3/1891 Harnish
511,378 A 12/1893 Van Wagoner
533,334 A 1/1895 Yakley
572,719 A 12/1896 Reppeto et al.

(Continued)

FOREIGN PATENT DOCUMENTS

CA 2651731 A1 7/2010
CA 2802581 C 7/2015

(Continued)

OTHER PUBLICATIONS

Corrected Notice of Allowance for U.S. Appl. No. 18/370,715, dated Nov. 18, 2024, 2 Pages.

(Continued)

*Primary Examiner* — Matthew R McMahon

(74) *Attorney, Agent, or Firm* — Buchalter, a Professional Corporation

(57) ABSTRACT

A clamp assembly for a fall protection reinforcement post includes a clamp body at least partially defining a slot configured to receive a guardrail therethrough; a post fastener engaging the clamp body and configured to secure the clamp assembly to the fall protection reinforcement post; a slot stop engaging the clamp body and traversing a bottom slot end of the slot, the slot stop configured to prevent the guardrail from disengaging the slot at the bottom slot end; and a clamp spring biasing the clamp assembly to an untightened configuration.

22 Claims, 11 Drawing Sheets

(56) References Cited

U.S. PATENT DOCUMENTS

| | | | | |
|---|---|---|---|---|
| 583,785 | A | | 6/1897 | Brown |
| 589,898 | A | | 9/1897 | Johnston |
| 603,157 | A | | 4/1898 | Spitzenberg |
| 613,078 | A | | 10/1898 | Robbns |
| 636,855 | A | | 11/1899 | Sawyer |
| 759,344 | A | | 5/1904 | Carolan |
| 776,624 | A | | 12/1904 | Steward |
| 793,371 | A | | 6/1905 | Hansberger |
| 858,345 | A | | 6/1907 | Kaufman |
| 866,195 | A | * | 9/1907 | Dillman et al. ....... F16M 13/02 248/316.5 |
| 869,231 | A | | 10/1907 | Colvin |
| 965,692 | A | * | 7/1910 | Culp .................... E04H 17/124 256/52 |
| 981,562 | A | * | 1/1911 | Holladay et al. ..... E04H 17/124 294/134 |
| 997,725 | A | | 7/1911 | Wilson |
| 1,004,308 | A | | 9/1911 | Stidworthy |
| 1,036,447 | A | | 8/1912 | Bushnell |
| 1,044,921 | A | * | 11/1912 | Schneider ............ E04H 17/124 256/52 |
| 1,050,589 | A | | 1/1913 | Young |
| 1,161,704 | A | | 11/1915 | Ljeso |
| 1,199,583 | A | | 9/1916 | McConnohie |
| 1,204,942 | A | * | 11/1916 | Clanton et al. ....... E04H 17/124 294/136 |
| 1,323,144 | A | * | 11/1919 | Alig ..................... E04H 17/124 256/52 |
| 1,599,928 | A | | 9/1926 | Sweeney |
| 1,742,838 | A | | 1/1930 | Williams |
| 1,793,106 | A | | 2/1931 | Lindemuth |
| 1,804,420 | A | | 5/1931 | Kelley |
| 1,814,664 | A | | 7/1931 | Cahill et al. |
| 1,848,527 | A | | 3/1932 | Hickey |
| 2,065,562 | A | | 12/1936 | Brown |
| 2,139,642 | A | | 12/1938 | Alfred |
| 2,168,954 | A | | 8/1939 | Jacob et al. |
| 2,222,249 | A | | 11/1940 | Borgen |
| 2,227,553 | A | | 1/1941 | Paque |
| 2,306,661 | A | | 12/1942 | Gengler |
| 2,351,261 | A | | 6/1944 | Hall |
| 2,369,225 | A | | 2/1945 | George |
| 2,431,431 | A | | 11/1947 | Shenk |
| 2,470,318 | A | | 5/1949 | Samuel |
| 2,515,615 | A | | 7/1950 | Tetzlaff |
| 2,573,239 | A | | 10/1951 | Barrett |
| 2,895,716 | A | | 7/1959 | Veltri |
| 3,684,248 | A | | 8/1972 | Maes, Jr. |
| 3,880,405 | A | | 4/1975 | Brueske |
| 4,040,604 | A | | 8/1977 | Langlie et al. |
| D245,792 | S | | 9/1977 | Dougherty |
| 4,058,882 | A | | 11/1977 | Muckelrath |
| 4,185,360 | A | | 1/1980 | Prete, Jr. et al. |
| 4,268,012 | A | | 5/1981 | Ruehle et al. |
| D260,855 | S | | 9/1981 | Hobson |
| 4,341,029 | A | | 7/1982 | Heard |
| 4,409,907 | A | | 10/1983 | Norton |
| 4,433,831 | A | | 2/1984 | Bunger |
| 4,475,854 | A | | 10/1984 | Ericsson |
| 4,493,480 | A | | 1/1985 | Nichol |
| 4,604,773 | A | | 8/1986 | Weber et al. |
| 4,782,915 | A | | 11/1988 | King |
| 4,786,223 | A | | 11/1988 | Crissy et al. |
| 4,787,602 | A | | 11/1988 | Pidgeon |
| 4,823,443 | A | | 4/1989 | Waters |
| 4,879,800 | A | | 11/1989 | Rumman |
| 4,900,203 | A | | 2/1990 | Pope |
| 4,913,608 | A | | 4/1990 | Royball |
| 4,932,634 | A | | 6/1990 | Sura |
| 5,090,397 | A | | 2/1992 | Larsen et al. |
| 5,165,499 | A | | 11/1992 | Bell |
| 5,245,729 | A | | 9/1993 | Greff |
| 5,282,706 | A | | 2/1994 | Anthony et al. |
| 5,307,897 | A | | 5/1994 | Turner et al. |
| 5,319,870 | A | | 6/1994 | Weiss |
| 5,350,155 | A | | 9/1994 | Burk |
| 5,632,461 | A | | 5/1997 | von Helms et al. |
| 5,655,623 | A | | 8/1997 | Skyba |
| 5,727,648 | A | | 3/1998 | Jenkins, Jr. |
| 5,816,362 | A | | 10/1998 | Jenkins, Jr. |
| 6,007,053 | A | | 12/1999 | Huang |
| 6,021,702 | A | | 2/2000 | Rexroad |
| 6,029,556 | A | | 2/2000 | Rexroad |
| 6,158,092 | A | | 12/2000 | Huang |
| 6,202,964 | B1 | | 3/2001 | Thornhill |
| 6,241,174 | B1 | | 6/2001 | Nelsen et al. |
| 6,290,195 | B1 | | 9/2001 | Deuer |
| 6,547,218 | B2 | | 4/2003 | Landy |
| 6,665,910 | B2 | | 12/2003 | Huang |
| 6,681,892 | B2 | | 1/2004 | Husband |
| 6,705,597 | B1 | | 3/2004 | Reilly et al. |
| 6,779,630 | B2 | | 8/2004 | Choate |
| 6,840,194 | B2 | | 1/2005 | Young |
| 6,978,737 | B2 | | 12/2005 | Kirch et al. |
| 7,080,967 | B2 | | 7/2006 | Ackerman et al. |
| 7,140,802 | B2 | | 11/2006 | Lamore |
| 7,350,767 | B2 | | 4/2008 | Huang |
| 7,360,753 | B1 | | 4/2008 | Lin |
| 7,448,596 | B1 | | 11/2008 | Chang |
| D590,068 | S | | 4/2009 | Woller |
| 7,566,047 | B2 | | 7/2009 | Wall |
| 7,571,567 | B2 | | 8/2009 | Bortolussi |
| 7,617,963 | B1 | | 11/2009 | Jensen |
| 7,651,072 | B1 | | 1/2010 | Chang |
| 7,690,481 | B1 | | 4/2010 | Pederson |
| 7,845,621 | B1 | | 12/2010 | Lu |
| 7,874,047 | B2 | | 1/2011 | Breeden |
| 7,942,602 | B2 | | 5/2011 | Bunk et al. |
| 8,398,040 | B2 | | 3/2013 | Busch |
| 8,424,641 | B2 | * | 4/2013 | Pandazopoulos ... E04G 21/3223 182/113 |
| 8,424,852 | B2 | | 4/2013 | Anson et al. |
| 8,561,952 | B2 | | 10/2013 | Pfeiler |
| 8,632,056 | B1 | | 1/2014 | Roberts et al. |
| D709,361 | S | | 7/2014 | Caldwell |
| 8,814,145 | B2 | | 8/2014 | Herman |
| 8,925,904 | B2 | | 1/2015 | Christoffer et al. |
| 9,156,507 | B1 | | 10/2015 | Reed |
| 9,567,768 | B1 | | 2/2017 | Galla |
| D852,614 | S | | 7/2019 | Schloss |
| D852,615 | S | | 7/2019 | Schloss |
| 10,456,612 | B2 | | 10/2019 | McGhee |
| 10,689,866 | B2 | * | 6/2020 | Baca ......................... E04G 5/14 |
| 10,793,052 | B1 | | 10/2020 | Rafuse |
| 10,814,774 | B2 | | 10/2020 | Millett et al. |
| 10,836,299 | B2 | | 11/2020 | Hatcher |
| 10,857,930 | B1 | | 12/2020 | Levi |
| D909,860 | S | | 2/2021 | Johnston et al. |
| 10,988,071 | B2 | | 4/2021 | Kingery |
| D925,348 | S | | 7/2021 | Norfleet et al. |
| 11,198,038 | B1 | | 12/2021 | Power, II et al. |
| 11,753,836 | B2 | | 9/2023 | Mackarvich et al. |
| 11,795,713 | B2 | | 10/2023 | Mackarvich et al. |
| D1,015,865 | S | | 2/2024 | Mackarvich |
| 12,173,519 | B2 | | 12/2024 | Mackarvich et al. |
| 2002/0063248 | A1 | | 5/2002 | Siegler et al. |
| 2002/0096396 | A1 | | 7/2002 | Harmston |
| 2003/0098202 | A1 | | 5/2003 | Husband |
| 2004/0135134 | A1 | | 7/2004 | Rice |
| 2004/0216952 | A1 | | 11/2004 | Woller |
| 2006/0180800 | A1 | | 8/2006 | Tremblay |
| 2006/0197001 | A1 | | 9/2006 | Parker et al. |
| 2006/0197071 | A1 | | 9/2006 | Huang |
| 2007/0034165 | A1 | | 2/2007 | Yang |
| 2007/0176401 | A1 | | 8/2007 | Adshead et al. |
| 2008/0173854 | A1 | | 7/2008 | Meaux et al. |
| 2010/0301297 | A1 | * | 12/2010 | Chapman ............ E04G 21/3219 256/47 |
| 2013/0075556 | A1 | | 3/2013 | Pfeiler |
| 2014/0102829 | A1 | | 4/2014 | Stearns et al. |
| 2016/0250961 | A1 | | 9/2016 | Tolly et al. |
| 2016/0347233 | A1 | | 12/2016 | Kingery |
| 2018/0340343 | A1 | | 11/2018 | Carpenter |

(56) References Cited

U.S. PATENT DOCUMENTS

| | | | |
|---|---|---|---|
| 2019/0143159 | A1 | 5/2019 | Grant |
| 2019/0381929 | A1 | 12/2019 | Millett et al. |
| 2021/0238872 | A1 | 8/2021 | Brim, III et al. |
| 2023/0060153 | A1 | 3/2023 | Lowrey |
| 2023/0228108 | A1 | 7/2023 | Mackarvich et al. |
| 2023/0228109 | A1 | 7/2023 | Mackarvich et al. |
| 2023/0399863 | A1 | 12/2023 | Mackarvich et al. |
| 2024/0011310 | A1 | 1/2024 | Mackarvich et al. |
| 2025/0059786 | A1 | 2/2025 | Mackarvich et al. |

FOREIGN PATENT DOCUMENTS

| | | | |
|---|---|---|---|
| DE | 102010025513 | A1 | 12/2011 |
| DE | 202018100633 | U1 | 2/2019 |
| WO | 2010085872 | A1 | 8/2010 |

OTHER PUBLICATIONS

Extended European Search Report for European Application No. 22215180.5, dated May 23, 2023, 7 pages.
Extended European Search Report for European Application No. 23165454.2, dated Feb. 15, 2024, 6 pages.
Final Office Action for U.S. Appl. No. 17/578,295, dated Sep. 7, 2022, 20 pages.
Final Office Action for U.S. Appl. No. 18/227,199, dated Feb. 12, 2024, 37 pages.
Final Office Action for U.S. Appl. No. 18/370,715, dated Feb. 22, 2024, 44 pages.
Notice of Allowance for U.S. Appl. No. 18/227,199, filed Jul. 27, 2023, mailed Oct. 23, 2024, 10 pgs.
Non-Final Office Action for U.S. Appl. No. 17/578,295, dated Jan. 5, 2023, 22 pages.
Non-Final Office Action for U.S. Appl. No. 17/578,295, dated May 31, 2022, 18 pages.
Non-Final Office Action for U.S. Appl. No. 17/953,235, dated Mar. 2, 2023, 30 pages.
Non-Final Office Action for U.S. Appl. No. 18/227,199, dated Jun. 14, 2024, 26 pages.
Non-Final Office Action for U.S. Appl. No. 18/227,199, dated Oct. 4, 2023, 25 pages.
Non-Final Office Action for U.S. Appl. No. 18/370,715, dated Jun. 17, 2024, 21 pages.
Non-Final Office Action for U.S. Appl. No. 18/370,715, dated Nov. 21, 2023, 16 pages.
Non-Final Office Action for U.S. Appl. No. 29/868,602, dated Apr. 13, 2023, 14 pages.
Notice of Allowance for U.S. Appl. No. 17/578,295, dated May 1, 2023, 16 pages.
Notice of Allowance for U.S. Appl. No. 17/953,235, dated Jun. 21, 2023, 23 pages.
Notice of Allowance for U.S. Appl. No. 29/868,602, dated Sep. 1, 2023, 13 pages.
Requirement for Restriction/Election for U.S. Appl. No. 17/578,295, dated Apr. 12, 2022, 7 pages.
Notice of Allowance for U.S. Appl. No. 18/370,715, filed Sep. 20, 2023, mailed Oct. 23, 2024, 9 pgs.
Corrected Notice of Allowance for US Appl. No. 18/227,199, dated Dec. 13, 2024, 2 pages.
Invitation to Pay Additional Fees for International Application No. PCT/US2024/061212, dated Feb. 13, 2025, 2 pages.
Non-Final Office Action for U.S. Appl. No. 18/955,232, dated Jan. 3, 2025, 26 pages.
Communication pursuant to Article 94(3) EPC for European Application No. 23165454.2, dated Mar. 26, 2025, 4 pages.
International Search Report and Written Opinion for International Application No. PCT/US2024/061212, mailed Apr. 10, 2025, 22 Pages.
Notice of Allowance for U.S. Appl. No. 18/955,232, dated Mar. 12, 2025, 7 pages.

* cited by examiner

CLAMP ASSEMBLY FOR FALL PROTECTION REINFORCEMENT POST

CROSS-REFERENCE TO RELATED APPLICATIONS

The present application claims the benefit of U.S. Provisional Patent Application No. 63/598,777, filed Nov. 14, 2023, which is hereby specifically incorporated by reference herein in its entirety.

TECHNICAL FIELD

This disclosure relates to building construction. More specifically, this disclosure relates to a clamp assembly for a reinforcement post of a fall protection system.

BACKGROUND

Building structures under construction often have elevated surfaces, such as elevated floor slabs, that require guardrails or other safety measures to prevent accidental falls. Guardrails are typically placed at a perimeter of the elevated surface and are secured to structural components of the building structure, such as pillars. However, guardrails that extend long distances between adjacent pillars can lack strength and stability at and around their midpoints.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is clamp assembly for a fall protection reinforcement post, the clamp assembly comprising a clamp body at least partially defining a slot configured to receive a guardrail therethrough; a post fastener engaging the clamp body and configured to secure the clamp assembly to the fall protection reinforcement post; a slot stop engaging the clamp body and traversing a bottom slot end of the slot, the slot stop configured to prevent the guardrail from disengaging the slot at the bottom slot end; and a clamp spring biasing the clamp assembly to an untightened configuration.

Further disclosed is a reinforcement post assembly comprising a fall protection reinforcement post defining a front post side and a rear post side; and a clamp assembly comprising: a clamp body; a post fastener engaging the clamp body and the reinforcement post to secure the clamp assembly to the reinforcement post; and a clamp spring biasing the clamp assembly to an untightened configuration; wherein a slot is defined between the clamp body and the front post side of the reinforcement post, the slot configured to receive a guardrail therethrough.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
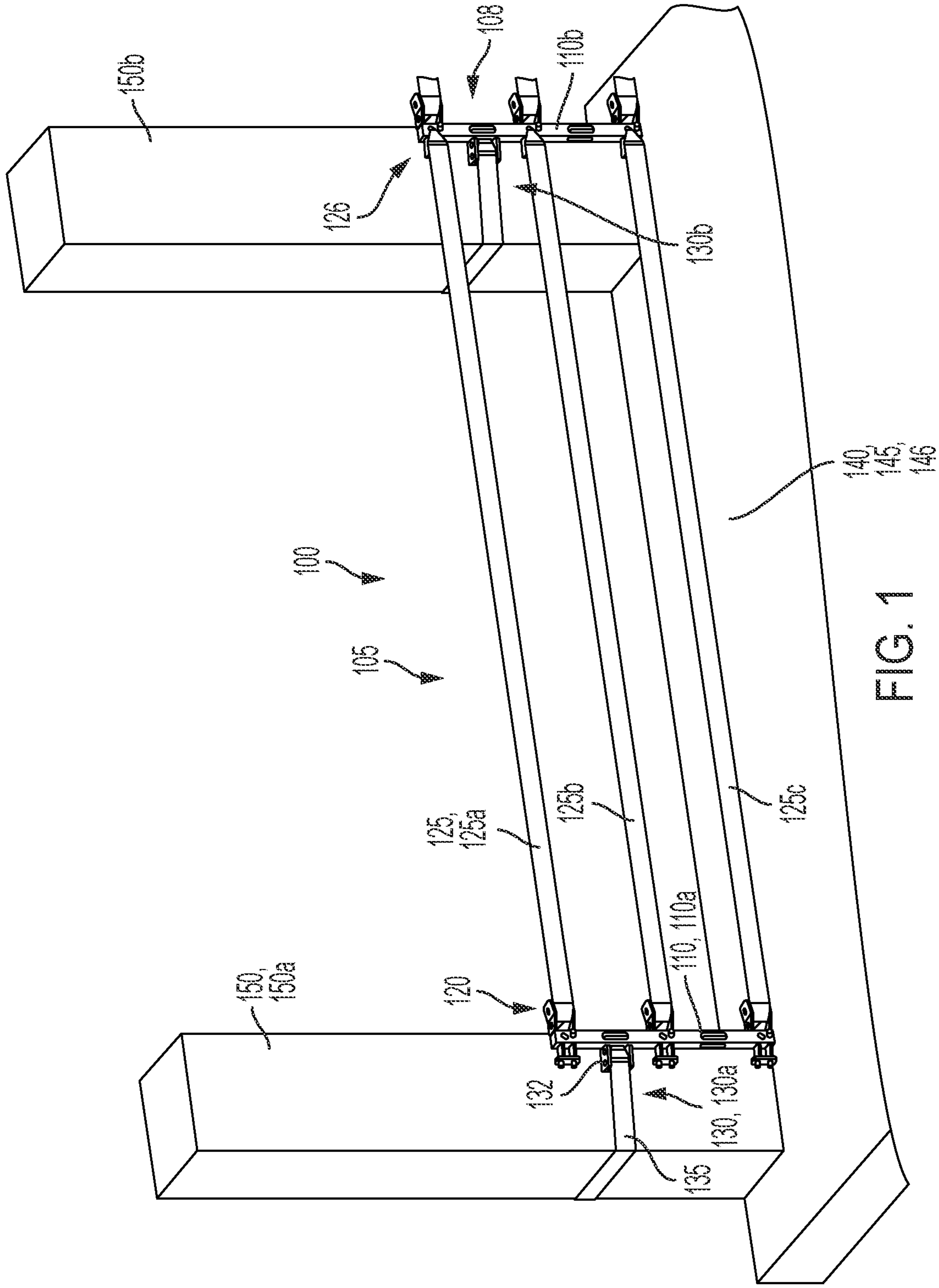
FIG. 1 PRIOR ART
FIG. 1 is a front perspective view of a fall protection system, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a guardrail clamp assembly and associated methods, systems, devices, and various apparatus. Example aspects of the guardrail clamp assembly can comprise a clamp body, a post fastener, a slot stop, and a clamp spring. It would be understood by one of skill in the art that the guardrail clamp assembly is described in but a few exemplary embodiments among many. No particular terminology or description should be considered limiting on the disclosure or the scope of any claims issuing therefrom.

FIG. 1 is a front perspective view of a fall protection system 100, in accordance with one aspect of the present disclosure. The fall protection system 100 can be secured to a structural component of a structure, such as a building structure 140 under construction, to prevent accidental falls from an upper floor surface 146 of an elevated slab 145 or other elevated surface of the building structure 140. The structural component can be a substantially vertical pillar 150, for example and without limitation. In the present aspect, the building structure 140 can comprise the elevated slab 145 and at least one of the substantially vertical pillars 150 extending upward therefrom, and the fall protection system 100 can be coupled to the at least one pillar 150. In the present aspect, the at least one pillar 150 can comprise a first pillar 150*a* and a second pillar 150*b*, and the fall protection system 100 can be coupled to and can extend between the first and second pillars 150*a,b*. In other aspects, the building structure 140 can comprise more or fewer pillars 150. For example, the building structure 140 may comprise additional pillars 150 and the fall protection system 100 can be coupled to and can extend between the additional pillars 150. Example aspects of such a fall protection system 100 are further disclosed in U.S. Pat. No. 11,753,836, issued on Sep. 12, 2023, and U.S. Pat. No. 11,795,713, issued on Oct. 24, 2023, each of which is hereby specifically incorporated by reference herein in its entirety.

Example aspects of the fall protection system 100 can comprise a guardrail support frame 108. The guardrail support frame 108 can comprise at least one substantially vertical guardrail post 110. Each of the guardrail posts 110 can be secured to a corresponding one of the vertical pillars 150. For example, in the present aspect, the guardrail posts 110 can comprise at least a first guardrail post 110*a* secured to the first pillar 150*a* and a second guardrail post 110*b* secured to the second pillar 150*b*. According to example aspects, each of the guardrail posts 110 can comprise a metal material, such as steel. In some aspects, the guardrail posts 110 can be formed as extruded steel posts. In other aspects, the guardrail posts 110 can comprise any other suitable material known in the art, including but not limited to other metals, and/or can be manufactured using any other desired method. In other aspects, the guardrail posts 110 can comprise a non-metal material. Moreover, in other aspects, the fall protection system 100 can comprise more or fewer guardrail posts 110. For example, the fall protection system 100 may comprise additional guardrail posts 110, each of which can be secured to an additional pillar 150.

The fall protection system 100 can further comprising one or more lateral safety guardrails 125 supported by the guardrail support frame 108. In the present aspect, the lateral safety guardrails 125 can extend laterally between the first and second guardrail posts 110*a,b*, and thus, can extend between the first and second pillars 150*a,b*. The lateral safety guardrails 125 can be oriented about horizontally, as shown in the present aspect, or can be oriented at an acute angle relative to horizontal. In the present aspect, each of the lateral safety guardrails 125 can be formed as a flexible guardrail strap 125. In other aspects, the lateral safety guardrails 125 can be semi-rigid or rigid. Furthermore, in the present aspect, the guardrail straps 125 can comprise an upper guardrail strap 125*a*, a middle guardrail strap 125*b*, and a lower guardrail strap 125*c*. Other aspects of the fall protection system 100 can comprise more or fewer of the guardrail straps 125 extending between the first and second guardrail posts 110*a,b*. Example aspects of the guardrail straps 125 can comprise a plastic material, such as, for example, nylon webbing. In other aspects, the guardrail straps 125 can comprise any other suitable material known in the art. In some aspects, the guardrail straps 125 can be inelastic or semi-inelastic, while in other aspects, the guardrail straps 125 can be elastic. Additionally, in example aspects, a length of each guardrail strap 125 can be sized to accommodate varying distances between the first and second guardrail posts 110*a,b*.

Example aspects of the guardrail support frame 108 can further comprise one or more substantially vertical reinforcement post assemblies 200 (shown in FIG. 2) arranged between the adjacent guardrail posts 110 (e.g., the first and second guardrail posts 110*a,b*) and coupled to each of the guardrail straps 125. The reinforcement post assemblies 200 can be freestanding (i.e., not attached to the building structure 140) and can provide reinforcement to the guardrail straps 125 between the adjacent guardrail posts 110, which can be beneficial in building structures 140 wherein a significant distance is defined between adjacent pillars 150. Each of the reinforcement post assemblies 200 can comprise a reinforcement post 210 (shown in FIG. 2). In example aspects, the reinforcement post 210 can comprise a metal material, such as steel. In some aspects, the reinforcement posts 210 can be formed as extruded steel posts, similar to the guardrail posts 110. In other aspects, the reinforcement posts 210 can comprise any other suitable material known in the art, including but not limited to other metals, and/or can be manufactured using any other desired method.

According to example aspects, each of the guardrail straps 125 can be mounted to the first guardrail post 110*a* by a corresponding guardrail attachment assembly 120. The guardrail attachment assemblies 120 can be vertically spaced along a length of the first guardrail post 110*a*, as shown. In example aspects, each of the guardrail straps 125 can be rolled up on the corresponding guardrail attachment assembly 120. To extend each of the guardrail straps 125 from the first guardrail post 110*a* to the second guardrail post 110*b*, the guardrail strap 125 can be unrolled or partially unrolled by pulling a free end 126 of the guardrail strap 125 towards the second guardrail post 110*b*. The free end 126 can be releasably secured to the second guardrail post 110*b* and the guardrail strap 125 can be held taut between the first and second guardrail posts 110*a,b*, as described in further detail below. With the guardrail straps 125 extended between the first and second guardrail posts 110*a,b*, the fall protection system 100 can define a substantially upright boundary 105 between the first and second pillars 150*a,b*, as shown.

As previously described, in some aspects, the fall protection system 100 can extend between additional pillars 150. As shown, in the present aspect, the fall protection system 100 can comprise a plurality of additional guardrail straps 125, each mounted to the second guardrail post 110*b* by an additional one of the guardrail attachment assemblies 120. Each of the additional guardrail straps 125 can be configured to extend between the second pillar 150*b* and an adjacent third pillar (not shown) of the building structure 140.

Example aspects of the fall protection system 100 can further comprise one or more pillar attachment assemblies 130. Each of the pillar attachment assemblies 130 can be configured to couple a corresponding one of the guardrail posts 110 to the corresponding vertical pillar 150. Securing the upright boundary 105 to the vertical pillars 150 can prevent movement thereof and ensure safe and proper functioning of the fall protection system 100. For example, the pillar attachment assemblies 130 can comprise a first pillar attachment assembly 130*a* coupling the first guardrail post 110*a* to the first pillar 150*a* and a second pillar attachment assembly 130*b* coupling the second guardrail post 110*b* to the second pillar 150*b*. As shown, each pillar attachment assembly 130 can comprise a pillar attachment device 132 and a pillar attachment strap 135 that can be rolled up on the pillar attachment device 132.

Each pillar attachment device 132 can be mounted to the corresponding guardrail post 110, and the corresponding pillar attachment strap 135 can extend from the pillar attachment device 132 and wrap fully around the corresponding pillar 150. To wrap the pillar attachment strap 135 around the pillar 150, the pillar attachment strap 135 can be unrolled or partially unrolled by pulling a free end thereof around the pillar 150. The free end can then be releasably coupled to the corresponding guardrail post 110 to secure the pillar attachment strap 135 tautly around the pillar 150. In the present aspect, only one of the pillar attachment assemblies 130 secures each of the first and second guardrail posts 110*a,b* to the corresponding first and second pillars 150*a,b*. However, in other aspects, the fall protection system 100 can comprise additional pillar attachment assemblies 130 for securing each of the first and second guardrail posts 110*a,b* to the first and second pillars 150*a,b*. According to example aspects, a length of each pillar attachment strap 135 can be sized to accommodate pillars 150 of varying thicknesses.

Figure 2:
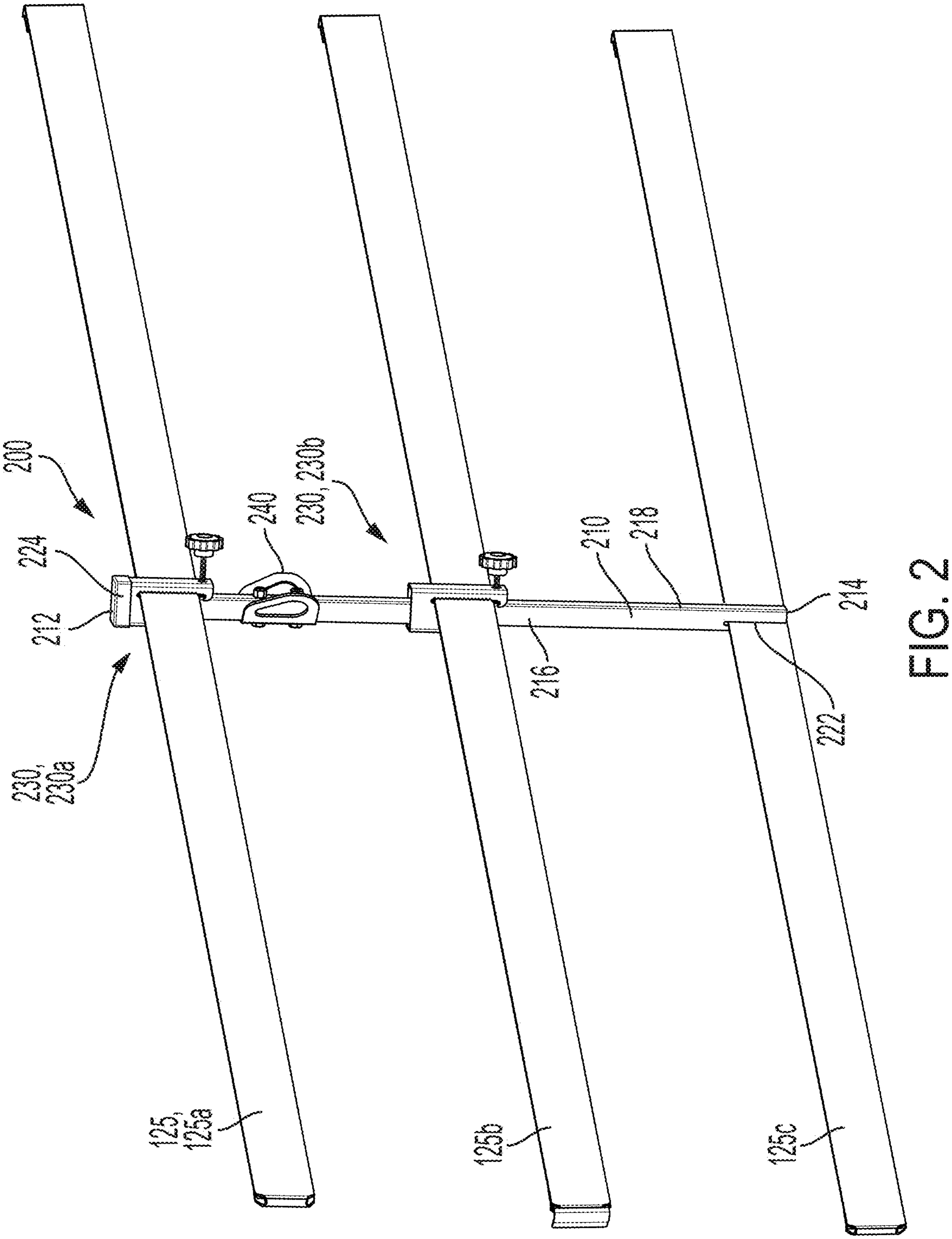
FIG. 2 is a front perspective view of a reinforcement post assembly for a fall protection system, in accordance with another aspect of the present disclosure.

FIG. 2 illustrates one of the substantially vertical reinforcement post assemblies 200 arranged at or around a midpoint between the adjacent guardrail posts 110 (shown in FIG. 1) and coupled to each of the guardrail straps 125 (e.g., the upper guardrail strap 125*a*, the middle guardrail strap 125*b*, and the lower guardrail strap 125*c*). In other aspects, the reinforcement assembly 200 can be coupled to more or fewer guardrail straps 125. In other aspects, additional reinforcement post assemblies 200 can be arranged between the adjacent guardrail posts 110 and coupled to the guardrail straps 125. The reinforcement post 210 of the reinforcement post assembly 200 can define an upper post end 212, a lower post end 214 opposite the upper post end 212, and a middle post region 216 therebetween. The lower post end 214 can generally confront or rest on the upper floor surface 146 (shown in FIG. 1) of the elevated slab 145 (shown in FIG. 1), and the reinforcement post 210 can extend substantially vertically upward therefrom, as shown. In some aspects, a post end cap 910 (shown in FIG. 9) can be coupled to the reinforcement post 210 at the upper post end 212 thereof to cover an upper post opening 610 (shown in FIG. 6). The upper post opening 610 can allow access into a hollow center 612 (shown in FIG. 6) of the reinforcement post 210. The post end cap 910 can comprise a rubber material in some aspects; in other aspects, the post end cap 910 can comprise plastic, metal, or any other suitable material. The reinforcement post 210 can further define a front post side 218 and a rear post side 320 (shown in FIG. 3) opposite the front post side 218.

Figure 15:
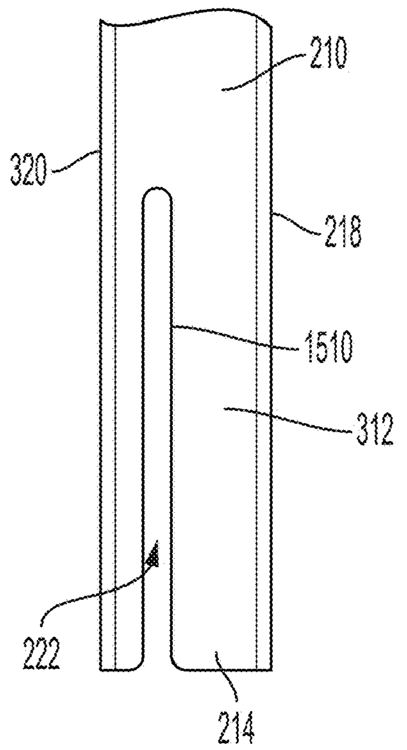
FIG. 15 is a left side view of a bottom end of the reinforcement post of FIG. 9.

According to example aspects, a strap engagement slot 222 can extend substantially vertically into the reinforcement post 210 at the lower post end 214. The lower guardrail strap 125*c* can extend laterally through the strap engagement slot 222 to secure the lower guardrail strap 125*c* to the reinforcement post assembly 200. The strap engagement slot 222 is also shown in FIG. 15 and described in further detail below. Additionally, the reinforcement post assembly 200 can comprise one or more guardrail clamp assemblies 230 attached to the reinforcement post 210, as shown. Each of the guardrail clamp assemblies 230 can be coupled to a corresponding one of the guardrail straps 125. In the present aspect, an upper clamp assembly 230*a* of the guardrail clamp assemblies 230 can couple the upper guardrail strap 125*a* to the reinforcement post 210 proximate to the upper post end 212, and a middle clamp assembly 230*b* of the guardrail clamp assemblies 230 can couple the middle guardrail strap 125*b* to the reinforcement post 210 at the middle post region 216. In other aspects, a lower one of the guardrail clamp assemblies 230 can be attached to the reinforcement post 210 at the lower post end 214 thereof to couple the lower guardrail strap 125*c* thereto. Such a lower one of the guardrail clamp assemblies 230 can be provided instead of or in addition to the strap engagement slot 222.

In example aspects, a clamp end cap 224 can be coupled to the upper clamp assembly 230*a*. The clamp end cap 224 can comprise a rubber material in some aspects; in other aspects, the clamp end cap 224 can comprise plastic, metal, or any other suitable material. The middle clamp assembly 230*b* can be substantially the same as the upper clamp assembly 230*a*, without the clamp end cap 224. According to example aspects, the upper clamp assembly 230*a* can be slipped over reinforcement post 210 at either the upper post end 212 or the opposing lower post end 214 and can be slid along the reinforcement post 210 to position the upper clamp assembly 230*a* at or proximate to the upper post end 212. Similarly, the middle clamp assembly 230*b* can be slipped over the reinforcement post 210 at either the upper post end 212 or the opposing lower post end 214 and can be slid along the reinforcement post 210 to position the middle clamp assembly 230*b* at the middle post region 216.

Additionally, according to example aspects, the reinforcement post assembly 200 can comprise a fall arrest bracket 240 coupled to the reinforcement post 210. As described in further detail below, a user safety harness can be attached to the fall arrest bracket 240. In the present aspect, the fall arrest bracket 240 can be coupled to the reinforcement post 210 between the upper clamp assembly 230*a* and the middle clamp assembly 230*b*. In other aspects, the fall arrest bracket 240 can be positioned at any suitable location along the reinforcement post 210. In other aspects, the reinforcement post assembly 200 can comprise additional fall arrest brackets 240 or may not comprise the fall arrest bracket 240. The reinforcement post assembly 200 may comprise any other suitable fall arrest device(s) attached thereto.

Figure 3:
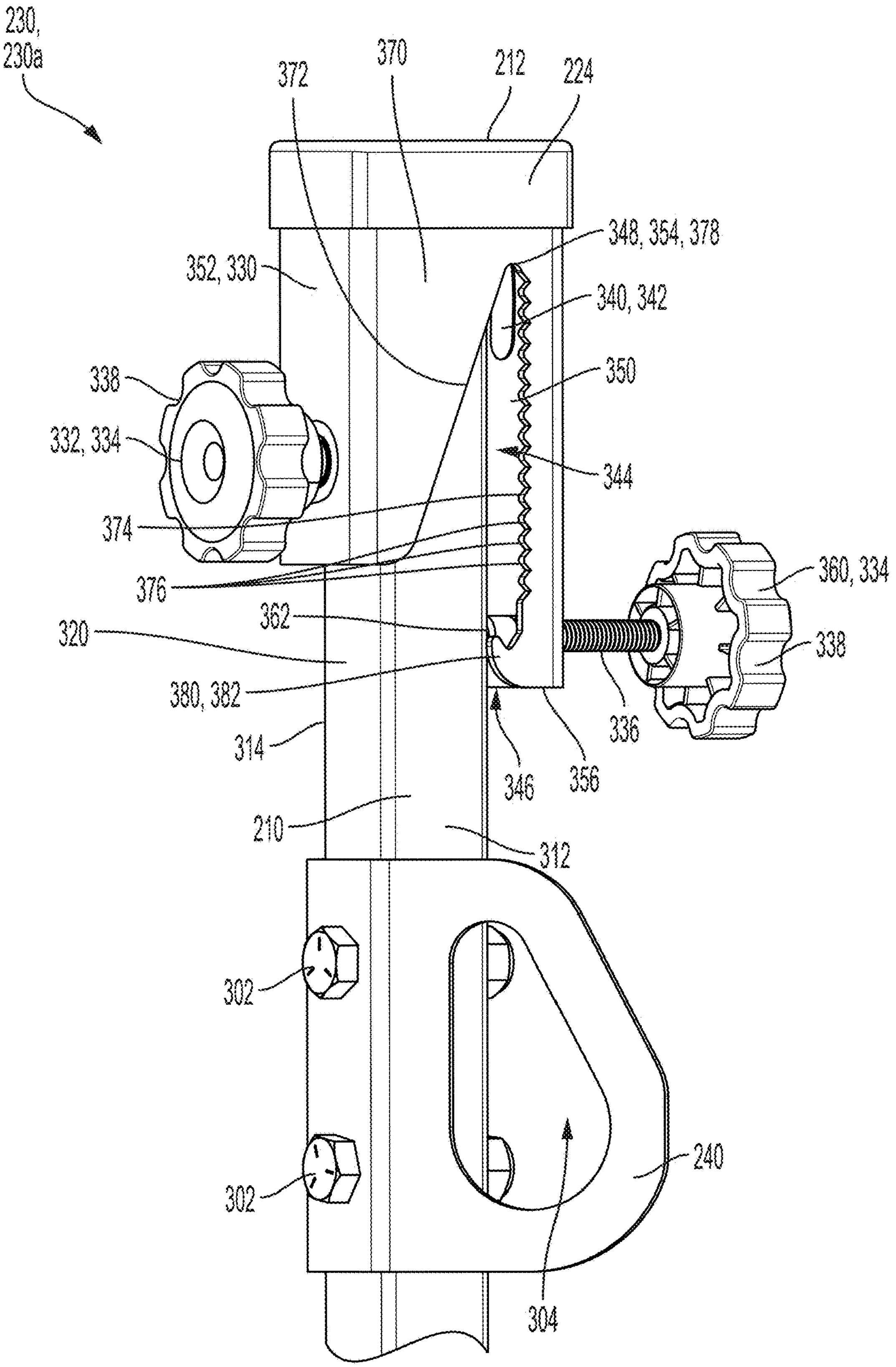
FIG. 3 is a rear perspective view of a guardrail clamp assembly of the reinforcement post assembly of FIG. 2.
Figure 4:
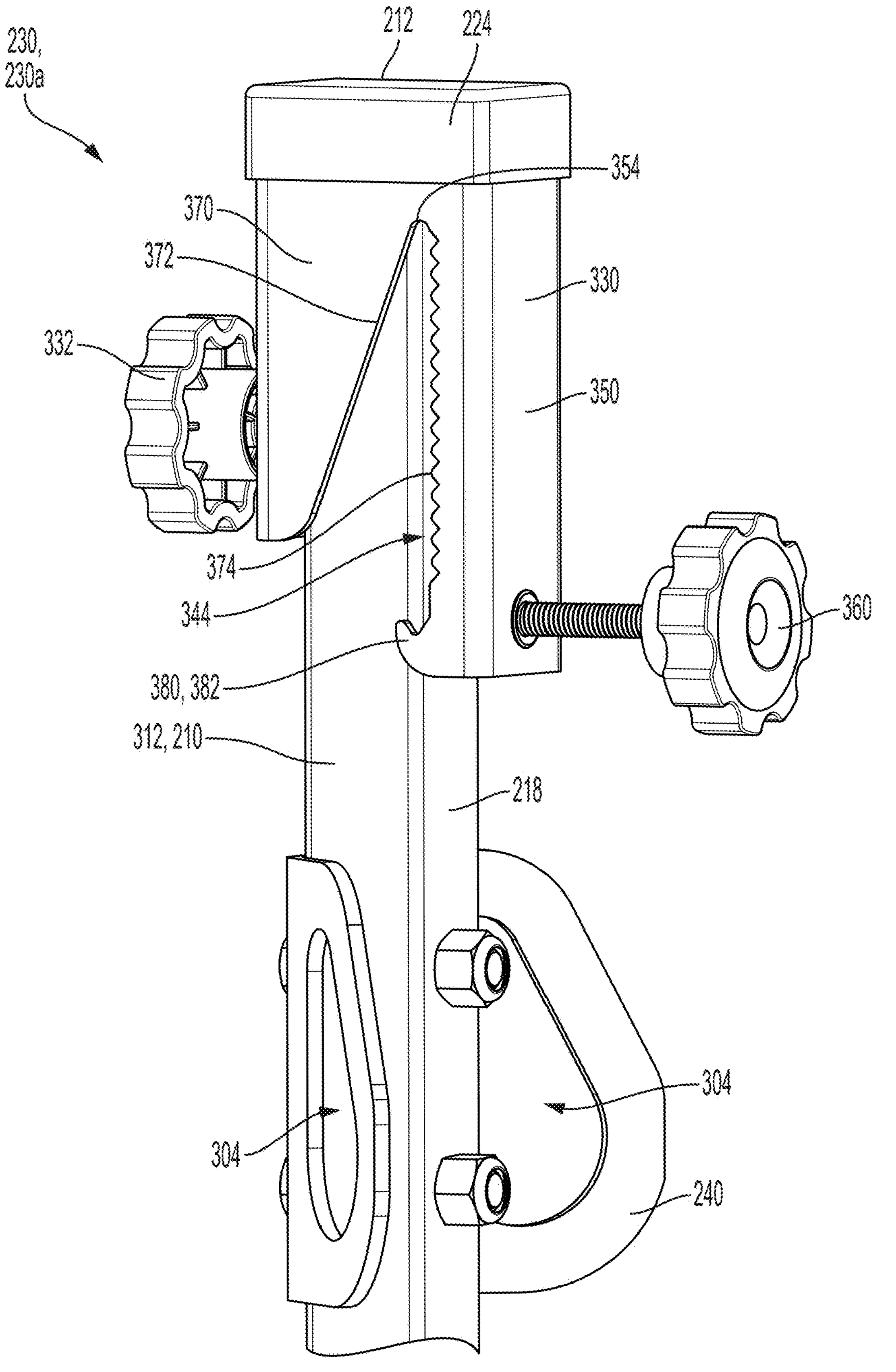
FIG. 4 is a front perspective view of the guardrail clamp assembly of FIG. 3.
Figure 5:
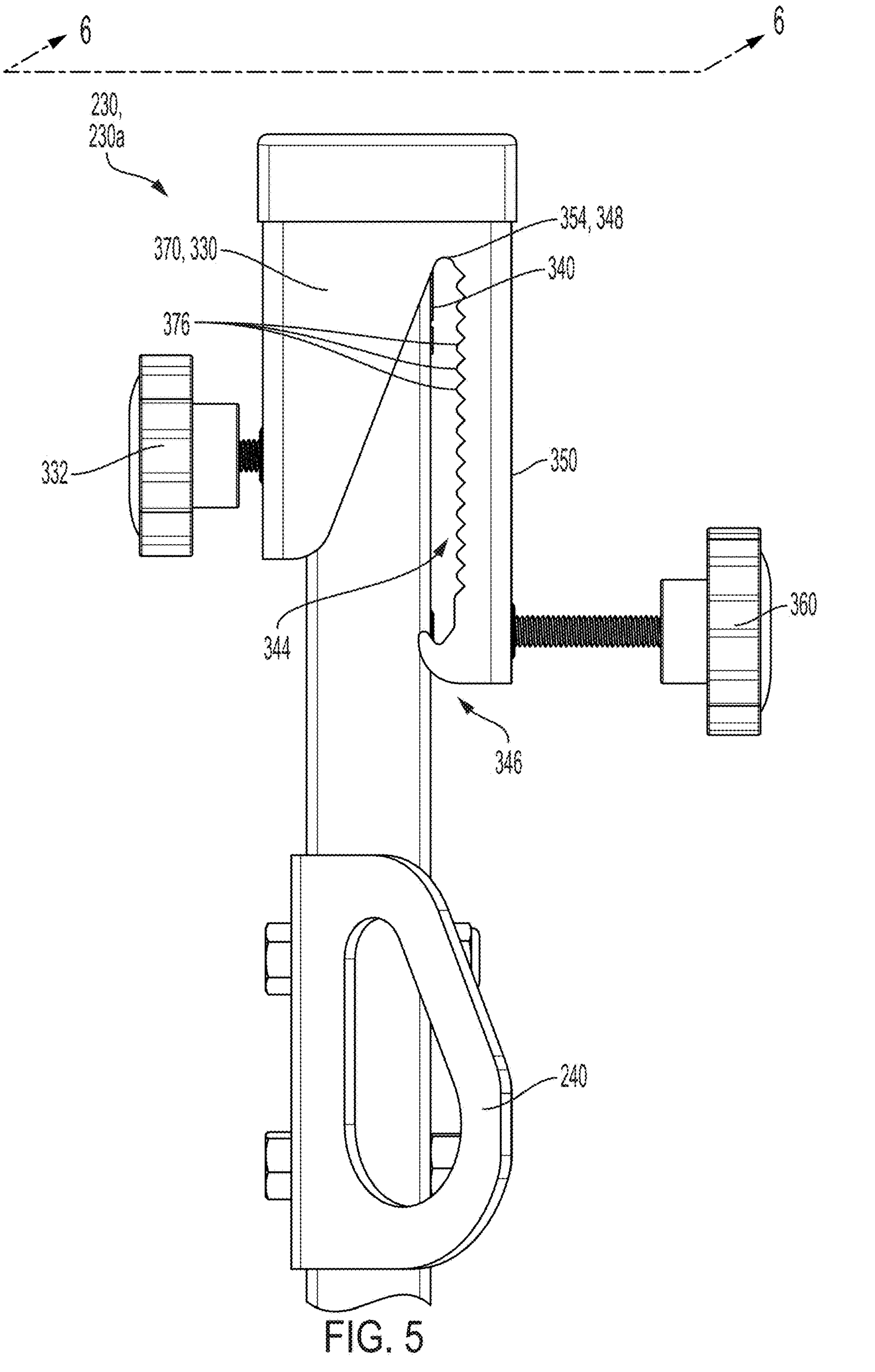
FIG. 5 is a left side view of the guardrail clamp assembly of FIG. 3.

FIGS. 3, 4, and 5, illustrate a rear perspective view, a front perspective view, and a left-side view, respectively, of the upper clamp assembly 230*a* and the fall arrest bracket 240 attached to the reinforcement post 210. According to example aspects, the fall arrest bracket 240 can be coupled to the reinforcement post 210 by a pair of bracket fasteners 302. In other aspects, more or fewer of the bracket fasteners 302 can couple the fall arrest bracket 240 to the reinforcement post 210. The bracket fasteners 302 can be bolts and nuts (as shown), screws, rivets, welding, or any other suitable fastener known in the art. As shown, the fall arrest bracket 240 can define one or more safety attachment openings 304 formed therethrough for securing the user safety harness to the fall arrest bracket 240. The fall arrest bracket 240 can comprise a metal material, composite material, plastic material, or any material of suitable strength. In some aspects, the fall arrest bracket 240 can be monolithically formed (i.e., formed a singular component that constitutes a single material without joints or seams) from a single piece of material and bent to the desired shape. Other aspects of the fall arrest bracket 240 may not be monolithically formed.

Each of the guardrail clamp assemblies 230 can comprise a clamp body 330, a post fastener 332 that can secure the clamp body 330 to the reinforcement post 210, and a clamp spring 340 that can bias the guardrail clamp assembly 230 to an untightened configuration (as shown in FIGS. 3, 4, and 5). A clamp slot 344 can be defined generally between a front clamp wall 350 of the clamp body 330 and the front post side 218 of the reinforcement post 210. The corresponding guardrail strap 125 (shown in FIG. 1) can extend laterally through the clamp slot 344. In the untightened configuration, a bottom slot end 346 of the clamp slot 344 can be open to allow the guardrail strap 125 to be inserted vertically into the slot. However, the clamp slot 344 can be closed at an opposite upper slot end 348 thereof to retain the guardrail strap 125 within the clamp slot 344 at the upper slot end 348. As shown, the clamp body 330 of the guardrail clamp assembly 230 can define an upper slot boundary 354 that can close the clamp slot 344 at the upper slot end 348. Each of the guardrail clamp assemblies 230 can further define a primary slot stop 360 mounted to the clamp body 330 that can adjustably engage the reinforcement post 210 to close the bottom slot end 346 in the tightened configuration and retain the guardrail strap 125 within the clamp slot 344.

Figure 13:
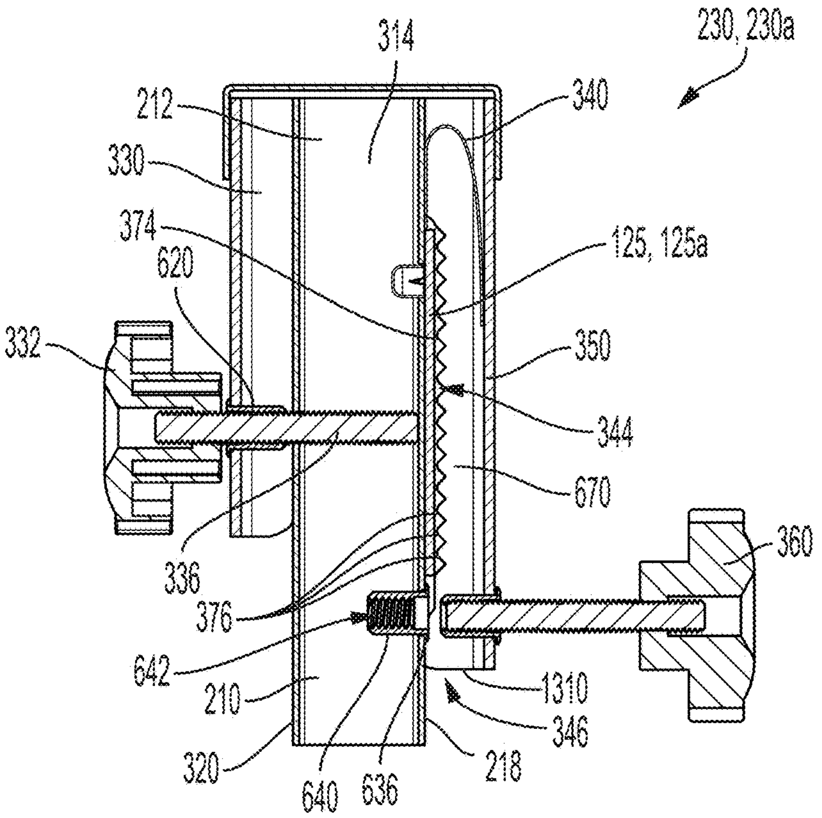
FIG. 13 is a cross-sectional view of the guardrail clamp assembly of FIG. 3, taken along line 6-6 in FIG. 5, showing a second and final step in tightening the guardrail clamp assembly to the tightened configuration.
Figure 14:
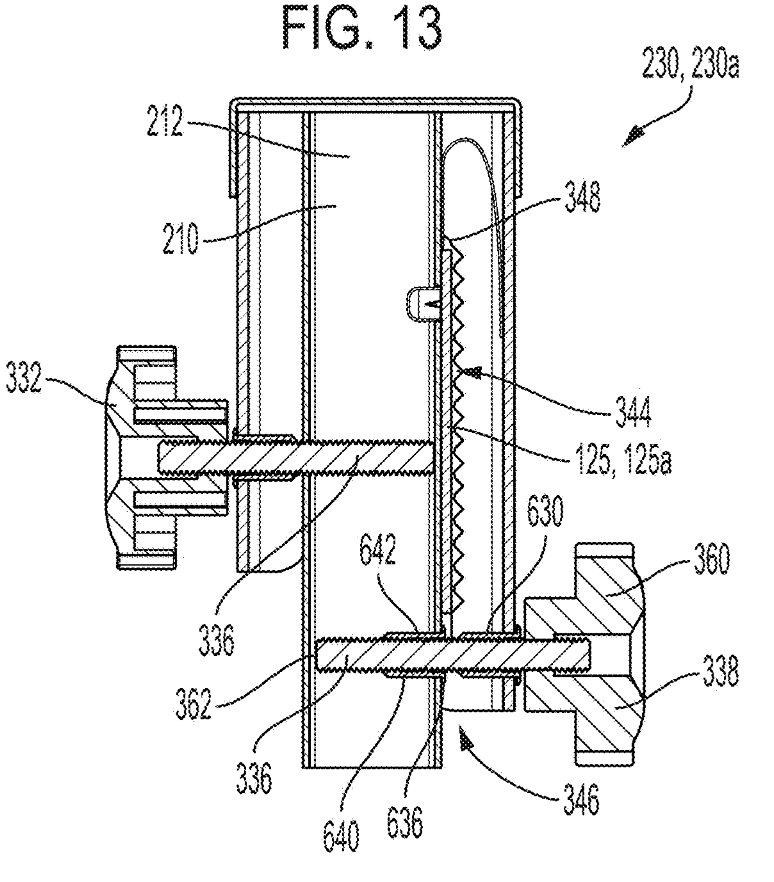
FIG. 14 is a cross-sectional view of the guardrail clamp assembly of FIG. 3, taken along line 6-6 in FIG. 5, showing a first step in reconfiguring a slot stop from an unblocked position to a blocked position.

The post fastener 332 can be untightened and tightened to adjust a width of the clamp slot 344 to reconfigure the guardrail clamp assembly 230 between the untightened configuration and a tightened configuration (shown in FIGS. 13 and 14). In the untightened configuration, the guardrail strap 125 can be somewhat loosely received within the clamp slot 344, and in the tightened configuration, the guardrail strap 125 can be clamped tightly between the clamp body 330 and the reinforcement post 210. In the present aspect, the post fastener 332 can be a threaded bolt fastener 334, which can extend through a rear clamp wall 352 of the clamp body 330, opposite the front clamp wall 350, and into the reinforcement post 210 at the rear post side 320. The threaded bolt fastener 334 can comprise a threaded shaft 336 that can engage a corresponding threaded fastener bore 622 (shown in FIG. 6) of the guardrail clamp assembly 230. The threaded bolt fastener 334 can further comprise an adjustment knob 338 coupled to the threaded shaft 336. The adjustment knob 338 can be rotated to tighten or untighten the threaded shaft 336 relative to the clamp body 330.

In example aspects, the clamp spring 340 can be arranged between the front post side 218 of the reinforcement post 210 and the front clamp wall 350 of the clamp body 330. The clamp spring 340 can bias the front clamp wall 350 away from the front post side 218 to the untightened configuration. In the untightened configuration, the bottom slot end 346 can be open and the guardrail strap 125 can be loosely received within the clamp slot 344. As the post fastener 332 is tightened, the spring force of the clamp spring 340 can be overcome and the front clamp wall 350 can be drawn towards the front post side 218, as described in further detail below. In the present aspect, the clamp spring 340 can be a V-shaped button spring clip 342. The button spring clip 342 can be formed from stainless steel in example aspects;

however, in other aspects, the button spring clip 342 can be formed from any other suitably resilient material. In other aspects, the clamp spring 340 can be any other suitable spring known in the art.

The primary slot stop 360 can be arranged in an unblocked position, wherein the bottom slot end 346 of the clamp slot 344 is unblocked by the primary slot stop 360, and a blocked position, wherein the bottom slot end 346 of the clamp slot 344 is blocked by the primary slot stop 360. According to example aspects, the primary slot stop 360 can be substantially similar to the post fastener 332. That is, in example aspects, the primary slot stop 360 can be another one of the threaded bolt fasteners 334, which can extend through the front clamp wall 350 of the clamp body 330. The threaded bolt fastener 334 can comprise the threaded shaft 336 and the adjustment knob 338. The threaded shaft 336 of the primary slot stop 360 can engage a corresponding threaded stop bore 632 (shown in FIG. 6) of the guardrail clamp assembly. The adjustment knob 338 can be rotated to untighten or tighten the threaded shaft 336 of the primary slot stop 360 relative to the clamp body 330 between the unblocked and blocked positions, respectively. In the unblocked position, a distal stop end 362 of the threaded shaft 336 of the primary slot stop 360 can be spaced from the front post side 218 of the reinforcement post 210, and in the blocked position, the distal stop end 362 of the threaded shaft 336 can traverse the clamp slot 344 and can extend into the reinforcement post 210 at the front post side 218. In other aspects, the primary slot stop 360 can be formed as any other suitable device that can be selectively reconfigured to block and unblock the clamp slot 344 at or near the bottom slot end 346.

In example aspects, a first clamp sidewall 370 and a second clamp sidewall 670 (shown in FIG. 6) can extend between the front clamp wall 350 and the rear clamp wall 352. Each of the first clamp sidewall 370 and the second clamp sidewall 670 can define a substantially V-shaped notch 372. A forward edge 374 of each V-shaped notch 372 can at least partially define the clamp slot 344. According to example aspects, a plurality of gripping teeth 376 can be formed along the forward edge 374 of each V-shaped notch 372. The gripping teeth 376 can be configured to grip and retain the guardrail strap 125 in place when the guardrail strap 125 is clamped between the guardrail clamp assembly and the reinforcement post 210 in the tightened configuration. The upper slot boundary 354 of the clamp body 330 can be defined by the notch vertex 378 of each V-shaped notch 372. Other aspects of the guardrail clamp assembly 230 and/or the reinforcement post 210 can also or alternatively define any other suitable gripping device for aiding in gripping and retaining the guardrail strap 125 in place in the tightened configuration, such as, for example and without limitations, textured portions, non-slip pads (such as rubber pads), projections of any suitable shape and size, and the like.

Additionally, in some aspects, each of the first clamp sidewall 370 and the second clamp sidewall 670 can define a secondary slot stop 380 at a bottom wall end 356 thereof. Each of the secondary slot stops 380 can be formed as a stop hook 382. The stop hook 382 can extend towards the rear clamp wall 352, at least partially traversing the clamp slot 344 in the untightened configuration. In the tightened configuration, the stop hook 382 of the first clamp sidewall 370 can be positioned at a first post side 312 of the reinforcement post 210, and the stop hook 382 of the second clamp sidewall 670 can be positioned at an opposite second post side 314 of the reinforcement post 210. Thus, in the tightened configuration, the stop hooks 382 can further block the bottom slot end 346 of the clamp slot 344 to aid in retaining the guardrail strap 125 within the clamp slot 344.

Figure 6:
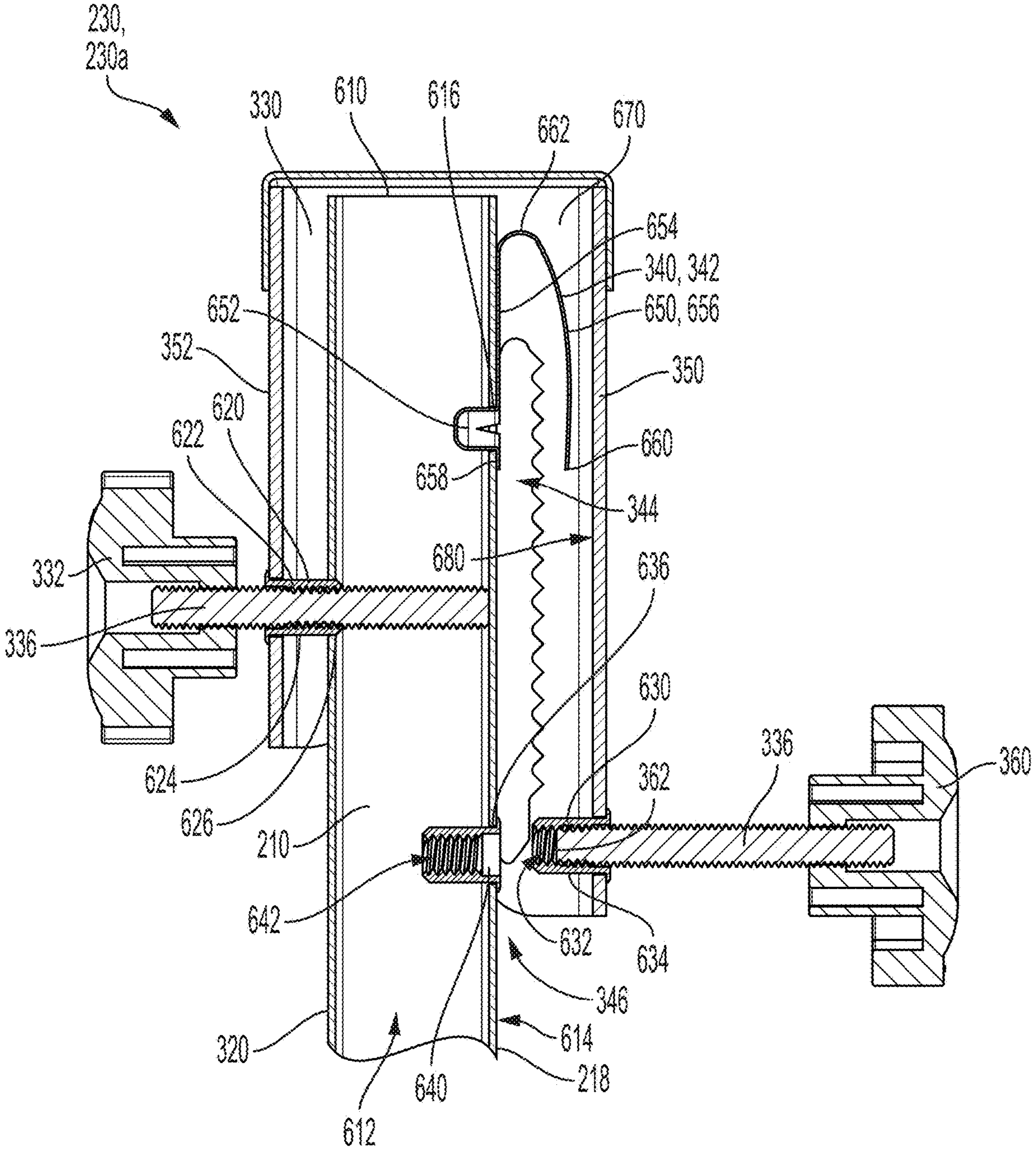
FIG. 6 is a cross-sectional view of the guardrail clamp assembly of FIG. 3, taken along line 6-6 in FIG. 5.

FIG. 6 illustrates a cross-sectional view of the upper clamp assembly 230*a* coupled to the reinforcement post 210, taken along line 6-6 in FIG. 5. As shown, the clamp body 330 of the guardrail clamp assembly 230 can be mounted to the reinforcement post 210 by the post fastener 332. A fastener rivet nut 620, or other suitable nut or fastener defining the threaded fastener bore 622, can be mounted within a rear clamp opening 624 formed through the rear clamp wall 352 of the clamp body 330. The fastener rivet nut 620 can define the threaded fastener bore 622, and the threaded shaft 336 of the post fastener 332 can engage the threaded fastener bore 622. The threaded shaft 336 of the post fastener 332 can further extend through a rear post opening 626 formed through the rear post side 320 of the reinforcement post 210.

Similarly, a stop rivet nut 630, or other suitable nut or fastener defining the threaded stop bore 632, can be mounted within a front clamp opening 634 formed through the front clamp wall 350 of the clamp body 330, proximate to the bottom slot end 346 of the clamp slot 344. The stop rivet nut 630 can define the threaded stop bore 632, and the threaded shaft 336 of the primary slot stop 360 can engage the threaded stop bore 632. The distal stop end 362 of the threaded shaft 336 of the primary slot stop 360 can be spaced from the front post side 218 in the unblocked position, as shown. In the blocked position, the distal stop end 362 of the primary slot stop 360 can extend transversely across the clamp slot 344 and through a front post opening 636 formed through the front post side 218 of the reinforcement post 210. In some aspects, a guide rivet nut 640 defining a threaded guide bore 642, or other suitable nut or fastener defining the threaded guide bore 642, can be mounted within the front post opening 636, and the threaded shaft 336 of the primary slot stop 360 can engage the threaded guide bore 642 in the blocked position. Other aspects, however, such as the aspect shown in FIG. 16, do not comprise the guide rivet nut 640.

The clamp spring 340 can be the button spring clip 342 in the present aspect, which can be arranged within the clamp slot 344 between the front post side 218 of the reinforcement post 210 and the front clamp wall 350 of the clamp body 330. The button spring clip 342 can define a substantially V-shaped resilient spring portion 650 and a button tab 652 extending from the substantially V-shaped resilient spring portion 650. The button spring clip 342 can be inverted such that the V-shaped resilient spring portion 650 can be arranged upside-down, as shown. The V-shaped resilient spring portion 650 can define a first leg 654 confronting an outer post surface 614 of the front post side 218 of the reinforcement post 210 and a second leg 656 confronting an inner clamp wall surface 680 of the front clamp wall 350. The first leg 654 can define a first end 658 of the V-shaped resilient spring portion 650, and the second leg 656 can define a second end 660 of the V-shaped resilient spring portion 650. A spring vertex 662 of the V-shaped resilient spring portion 650 can be oriented vertically above the first end 658 and the second end 660. The button tab 652 can extend outward from the first leg 654 proximate to the first end 658 and can engage a button opening 616 formed through the front post side 218. In other aspects, the clamp spring 340 can be arranged between the rear clamp wall 352 and the rear post side 320.

Figure 7:
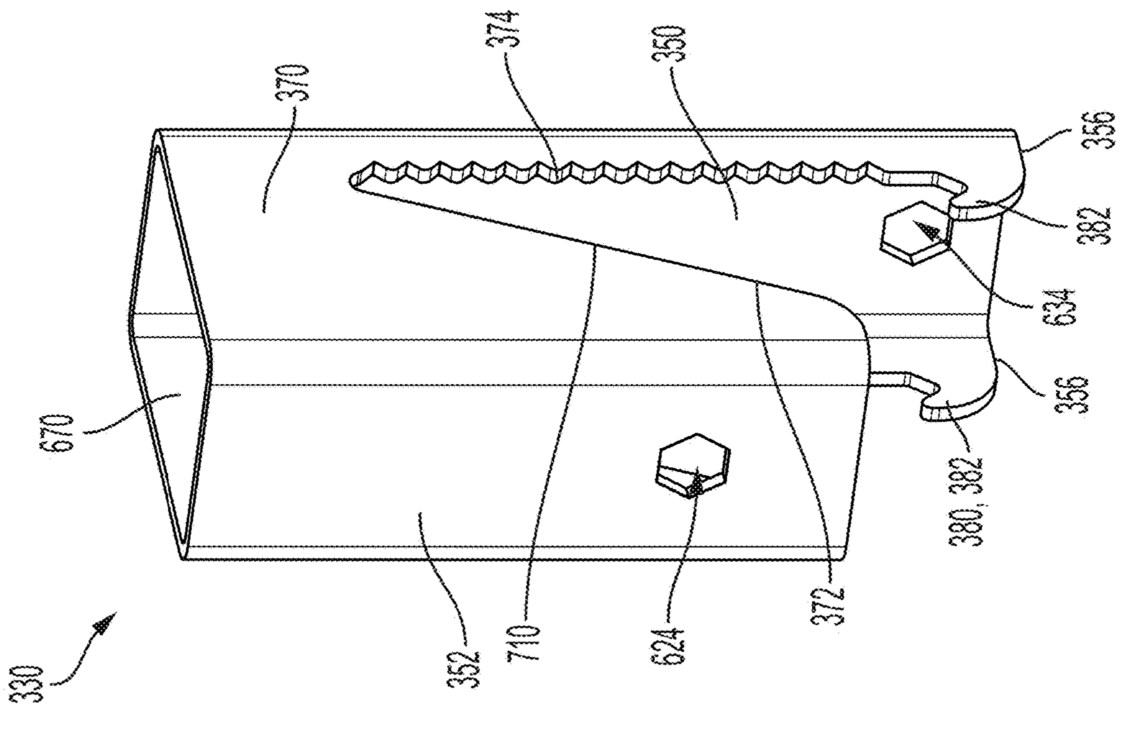
FIG. 7 is a rear perspective view of a clamp body of the guardrail clamp assembly of FIG. 3.

FIG. 7 illustrates an example aspect of the clamp body 330. Example aspects of the clamp body 330 can comprise a metal material, such as laser-cut steel, a plastic material, a composite material, or the like. The clamp body 330 can define the front clamp wall 350, the rear clamp wall 352, the first clamp sidewall 370, and the second clamp sidewall 670. The rear clamp opening 624 can be formed through the rear clamp wall 352, and the front clamp opening 634 can be formed through the front clamp wall 350. In example aspects, each of the rear clamp opening 624 and the front clamp opening 634 can be substantially hexagonal in shape. In other aspects, the rear clamp opening 624 and/or the front clamp opening 634 can define any other suitable shape. In some aspects, the fastener rivet nut 620 (shown in FIG. 6) and the stop rivet nut 630 (shown in FIG. 6) can be held in place within the rear clamp opening 624 and the front clamp opening 634, respectively, by deforming the fastener rivet nut 620 and the stop rivet nut 630 within the rear clamp opening 624 and the front clamp opening 634, such as by compressing the fastener rivet nut 620 and the stop riven nut 630 such that portions of the fastener rivet nut 620 and the stop riven nut 630 on either side of the rear clamp opening 624 and the front clamp opening 634, respectively, can be wider than each opening 624, 634.

Each of the first clamp sidewall 370 and the second clamp side wall can define the corresponding substantially V-shaped notch 372. Each V-shaped notch 372 can define the forward edge 374, and the plurality of gripping teeth 376 can be formed along the forward edge 374. In the present aspect, the forward edge 374 of each V-shaped notch 372 can be oriented substantially vertical, while a rearward edge 710 of each V-shaped notch 372 can angle towards the rear clamp wall 352. Each of the first clamp sidewall 370 and second clamp sidewall 670 can further define the stop hook 382 arranged at the bottom wall end 356 thereof and extending rearward towards the rear clamp wall 352. Each of the stop hooks 382 can curve slightly upward in the present aspect, relative to the orientation shown.

Figure 8:
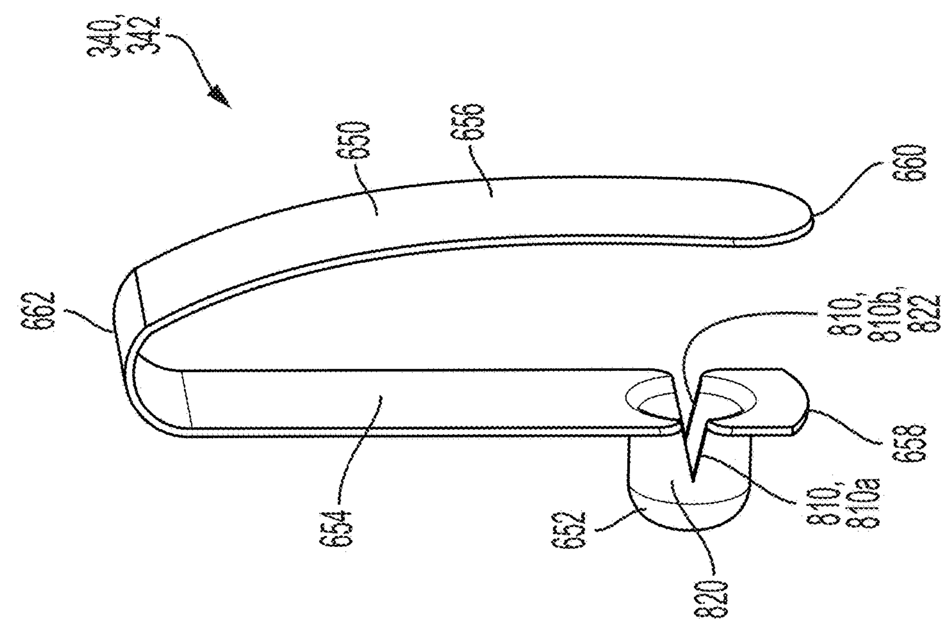
FIG. 8 is a front perspective view of a clamp spring of the guardrail clamp assembly of FIG. 3.

FIG. 8 illustrates an example aspect the clamp spring 340. As shown, the clamp spring 340 can be the button spring clip 342 in the present aspect. The button spring clip 342 can define the substantially V-shaped resilient spring portion 650 (arranged in an inverted orientation) and the button tab 652. The V-shaped resilient spring portion 650 can define the first leg 654 and the second leg 656, which can meet at the spring vertex 662 of the V-shaped resilient spring portion 650. The first leg 654 can define the first end 658 of the V-shaped resilient spring portion 650, and the second leg 656 can define the second end 660 of the V-shaped resilient spring portion 650. The button tab 652 can extend outward from the first leg 654, at or near the first end 658. In example aspects, the button tab 652 can define one or more relief notches 810 that can allow the button tab 652 to flex as the button tab 652 is pushed through the button opening 616 (shown in FIG. 6) of the front post side 218 (shown in FIG. 2). In the present aspect, a first relief notch **810*a* can be formed at a first button side 820 of the button tab 652 and a second relief notch 810*b* can be formed at an opposite second button side 822 of the button tab 652. Other aspects can comprise more or fewer relief notches 810**.

Figure 9:
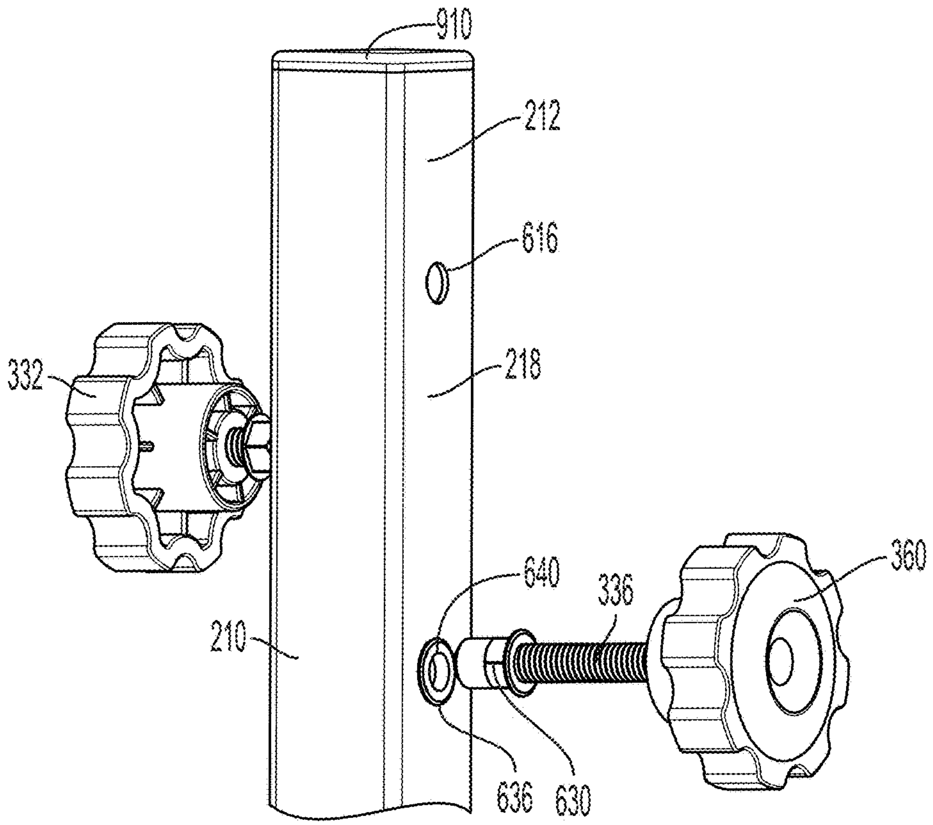
FIG. 9 is a front perspective view of a top end of a reinforcement post of the reinforcement post assembly of FIG. 2.
Figure 10:
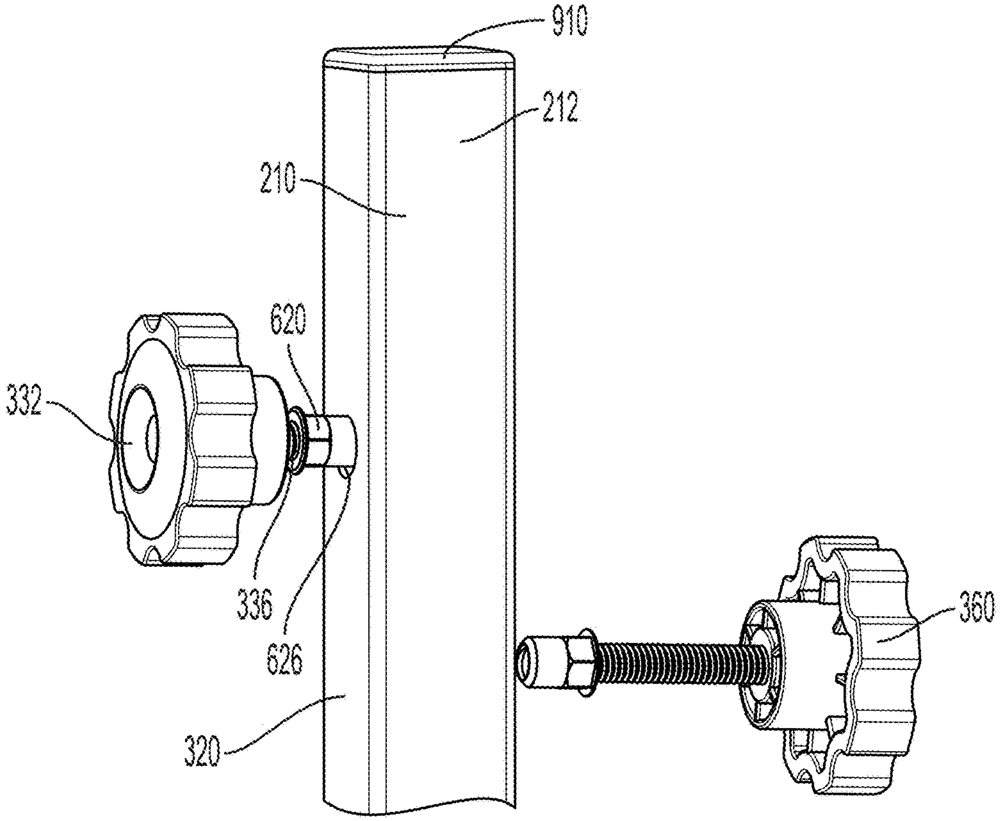
FIG. 10 is a rear perspective view of the top end of the reinforcement post of FIG. 9.

FIGS. 9 and 10 illustrate front and rear perspective views, respectively, of the upper post end 212 of the reinforcement post 210, along with the post fastener 332 and the primary slot stop 360 aligned with the rear post opening 626 (shown in FIG. 10) and the front post opening 636, respectively, of the reinforcement post 210. Referring to FIG. 9, the threaded shaft 336 of the primary slot stop 360 can engage the stop rivet nut 630, which can be mounted to the front clamp wall 350 (shown in FIG. 3) of the clamp body 330 (shown in FIG. 3). Additionally, the threaded shaft 336 of the primary slot stop 360 can be aligned with, and in the blocked position can engage, the front post opening 636 formed through the front post side 218 of the reinforcement post 210. In some aspects, the guide rivet nut 640 can be mounted within the front post opening 636, and the threaded shaft 336 of the primary slot stop 360 can engage the guide rivet nut 640 in the blocked configuration. Other aspects (such as the aspect shown in FIG. 16) may not comprise the guide rivet nut 640. Also shown in FIG. 9 is the button opening 616 formed through the front post side 218 of the reinforcement post 210, as well as the post end cap 910 coupled to the reinforcement post 210 at the upper post end 212.

Referring to FIG. 10, the threaded shaft 336 of the post fastener 332 can engage the fastener rivet nut 620, which can be mounted to the rear clamp wall 352 (shown in FIG. 3) of the clamp body 330 (shown in FIG. 3). Additionally, the threaded shaft 336 of the post fastener 332 can be aligned with and can engage the rear post opening 626 formed through the rear post side 320 of the reinforcement post 210. In the tightened configuration, the fastener rivet nut 620 may abut the rear post side 320 or may extend, or partially extend, through the rear post opening 626.

Figure 11:
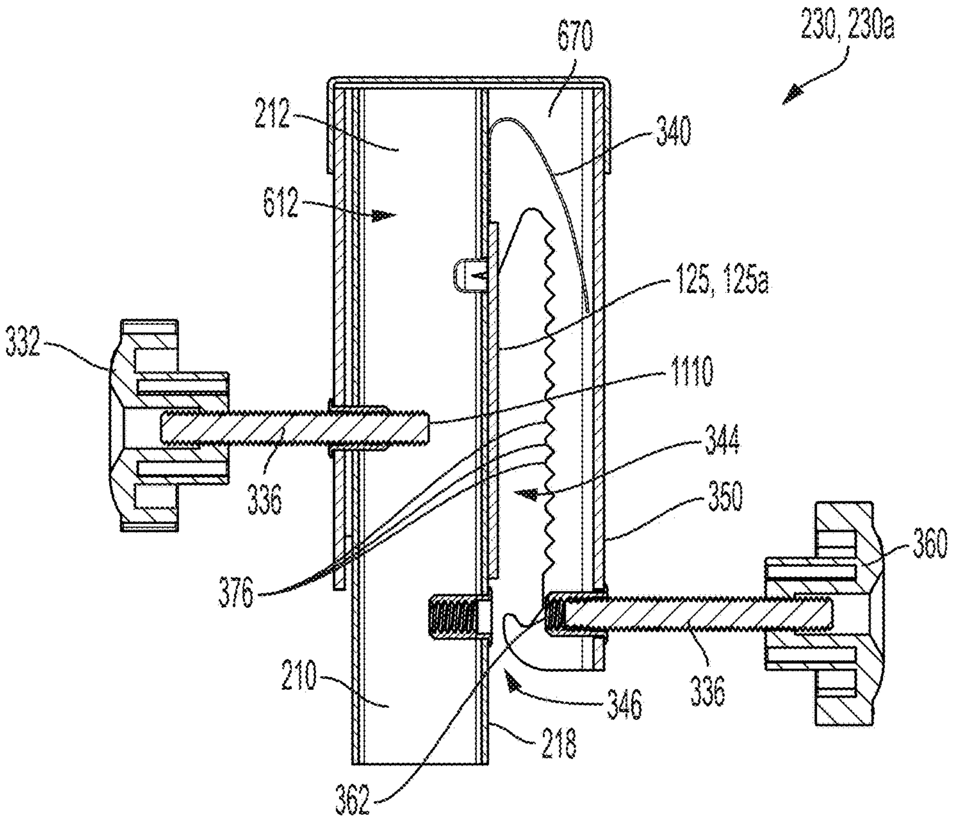
FIG. 11 is a cross-sectional view of the guardrail clamp assembly of FIG. 3, taken along line 6-6 in FIG. 5, wherein the guardrail clamp assembly is in an untightened configuration.

FIG. 11 illustrates a cross-sectional view of the upper clamp assembly **230*a* mounted to the reinforcement post 210 at the upper post end 212 and in the untightened configuration. As shown, the distal stop end 362 of the threaded shaft 336 of the primary slot stop 360 can be spaced from the front post side 218 of the reinforcement post 210, and the bottom slot end 346 of the clamp slot 344 can be open and unblocked. The upper guardrail strap 125*a* can be inserted into the clamp slot 344 through the open bottom slot end 346. Moreover, the gripping teeth 376 of the first clamp sidewall 370 (shown in FIG. 3) and the second clamp sidewall 670 can be spaced from the upper guardrail strap 125*a*, such that the upper guardrail strap 125*a* can be somewhat loosely received within the clamp slot 344. As shown, the clamp spring 340 arranged between the front post side 218 and the front clamp wall 350 can bias the front clamp wall 350 and the gripping teeth 376 forwardly away from the front post side 218 and the upper guardrail strap 125*a* in the untightened configuration. Moreover, in the untightened configuration, a distal fastener end 1110 of the threaded shaft 336 of the post fastener 332 can extend through the rear post side 320 of the reinforcement post 210 to be positioned within the hollow center 612 of the reinforcement post 210. In other aspects, the distal fastener end 1110 can be arranged external to the hollow center 612 in the untightened configuration. In some aspects, the distal fastener end 1110 can be spaced from the front post side 218 of the reinforcement post 210 in the untightened configuration, as shown, while in other aspects, the distal fastener 1110 may confront the front post side 218** in the untightened configuration.

Figure 12:
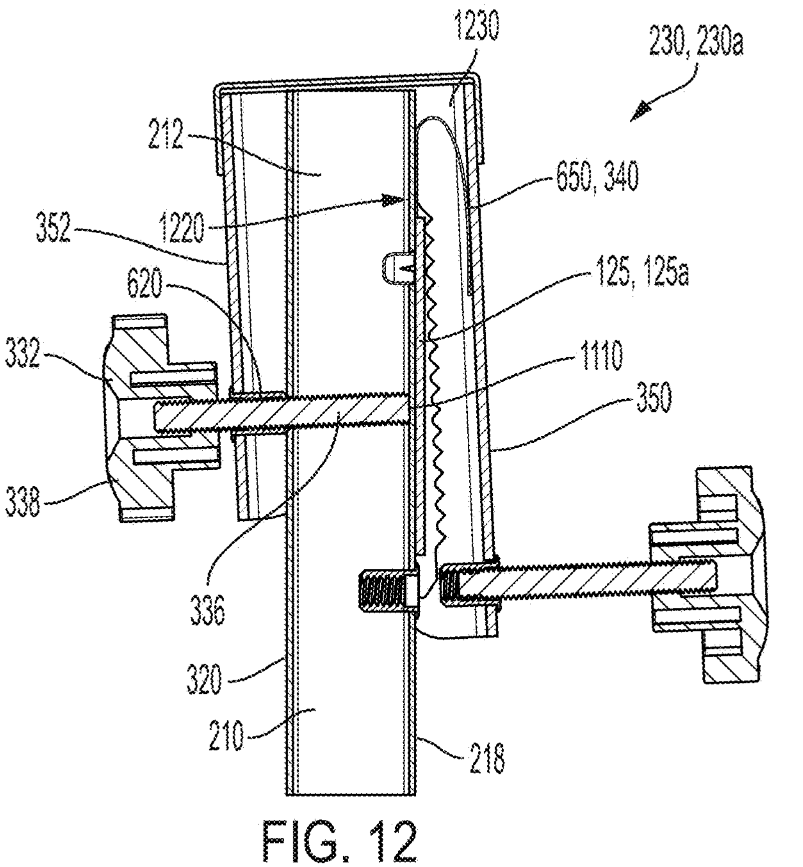
FIG. 12 is a cross-sectional view of the guardrail clamp assembly of FIG. 3, taken along line 6-6 in FIG. 5, showing a first step in tightening the guardrail clamp assembly.

FIG. 12 illustrates a first step in tightening the post fastener 332 to configure the upper clamp assembly **230*a* in the tightened configuration. By rotating the adjustment knob 338 of the post fastener 332, the threaded shaft 336 of the post fastener 332 can be tightened relative to the fastener rivet nut 620 to advance the distal fastener end 1110 of the threaded shaft 336 towards an inner post surface 1220 of the front post side 218. Once the distal fastener end 1110 has been advanced forward to abut the inner post surface 1220, the threaded shaft 336 of the post fastener 332 can further be rotated relative to the fastener rivet nut 620 to draw the fastener rivet nut 620 and rear clamp wall 352 towards the adjustment knob 338 of the post fastener 332. As the rear clamp wall 352 is drawn towards the adjustment knob 338 of the post fastener 332 and away from the rear post side 320, the front clamp wall 350 can be pressed against the clamp spring 340 and can overcome the spring force to be drawn towards the front post side 218. In example aspects, the front clamp wall 350 can first be pulled towards the front post side 218 at an upper clamp end 1230 of the clamp body 330 due to the inverted V-shape of the resilient spring portion 650 of the clamp spring 340**.

FIG. 13 illustrates a second and final step in tightening the post fastener 332 to configure the upper clamp assembly 230*a* in the tightened configuration. As shown, upon even further rotation of the threaded shaft 336 of the post fastener 332 relative to the fastener rivet nut 620, the spring force of the clamp spring 340 can be overcome and the front clamp wall 350 can be drawn towards the front post side 218 of the reinforcement post 210 at a lower clamp end 1310 of the clamp body 330. The front clamp wall 350 can be drawn towards the front post side 218 of the reinforcement post 210 until the gripping teeth 376 formed along the forward edge 374 of each of the first clamp sidewall 370 (shown in FIG. 3) and the second clamp sidewall 670 engage and hold the upper guardrail strap 125*a* against the front post side 218. The upper clamp assembly 230*a* can thereby be configured in the tightened configuration, and the upper guardrail strap 125*a* can be clamped in place between the clamp body 330 and the reinforcement post 210.

In some example aspects, the front clamp wall 350 can be wider than the front post side 218. When the post fastener 332 is tightened to configure the clamp assembly 230 in the tightened configuration, the forward edge 374 of each of the first clamp sidewall 370 and the second clamp sidewall 670 can be drawn past the front post side 218 to be arranged at the first post side 312 (shown in FIG. 3) and the second post side 314, respectively. The gripping teeth 376 can engage side portions of the guardrail strap 125 arranged at either side of the front post side 218 and can push the side portions of the guardrail strap 125 rearward towards the rear post side 320. The guardrail strap 125 can thereby wrap around the front post side 218 of the reinforcement post 210 and extend partially along the first post side 312 and second post side 314 thereof.

FIG. 14 illustrates the upper clamp assembly 230*a* in the tightened configuration and the primary slot stop 360 in the blocked position. To configure the primary slot stop 360 in the blocked position, the adjustment knob 338 of the primary slot stop 360 can be rotated to tighten the threaded shaft 336 of the primary slot stop 360 relative to the stop rivet nut 630. Tightening the threaded shaft 336 of the primary slot stop 360 can advance the distal stop end 362 of the threaded shaft 336 across the clamp slot 344 blocking the clamp slot 344 at the bottom slot end 346, and through the front post opening 636 of the reinforcement post 210. In some aspects, the guide rivet nut 640 can be mounted within the front post opening 636, and the threaded shaft 336 of the primary slot stop 360 can further engage the threaded guide bore 642 of the guide rivet nut 640. With the primary slot stop 360 in the blocked position, the upper guardrail strap 125*a* can be retained within the clamp slot 344 between the closed upper slot end 348 and the threaded shaft 336 of the primary slot stop 360. As previously described, the secondary slot stops 380 (shown in FIG. 3), if present, can further aid in retaining the upper guardrail strap 125*a* within the clamp slot 344.

FIG. 15 illustrates the lower post end 214 of the reinforcement post 210. As shown, the strap engagement slot 222 can extend substantially vertically upward into the reinforcement post 210 at the lower post end 214. In example aspects, the strap engagement slot 222 can be defined by a first slot 1510 formed in the first post side 312 of the reinforcement post 210 and a second slot (not shown) formed in the second post side 314 (shown in FIG. 3) of the reinforcement post 210 that can be laterally aligned with the first slot 1510. The second slot can be substantially the same in size and shape as the first slot 1510. The strap engagement slot 222 can extend laterally across the reinforcement post 210 from the first post side 312 to the second post side 314. In some aspects, the strap engagement slot 222 can be positioned closer to the rear post side 320 than to the front post side 218. In other aspects, however, the strap engagement slot 222 can be arranged at any suitable position between the rear post side 320 and the front post side 218. According to example aspects, the lower guardrail strap 125*c* (shown in FIG. 1) can extend laterally through the strap engagement slot 222 to secure the lower guardrail strap 125*c* to the reinforcement post 210. In other aspects, the lower guardrail strap 125*c* can be secured to the reinforcement post 210 by a lower one of the guardrail clamp assemblies 230 (shown in FIG. 2). Other aspects may not comprise any of the lower guardrail strap 125*c*, the strap engagement slot 222, and the lower one of the guardrail clamp assemblies 230.

Figure 16:
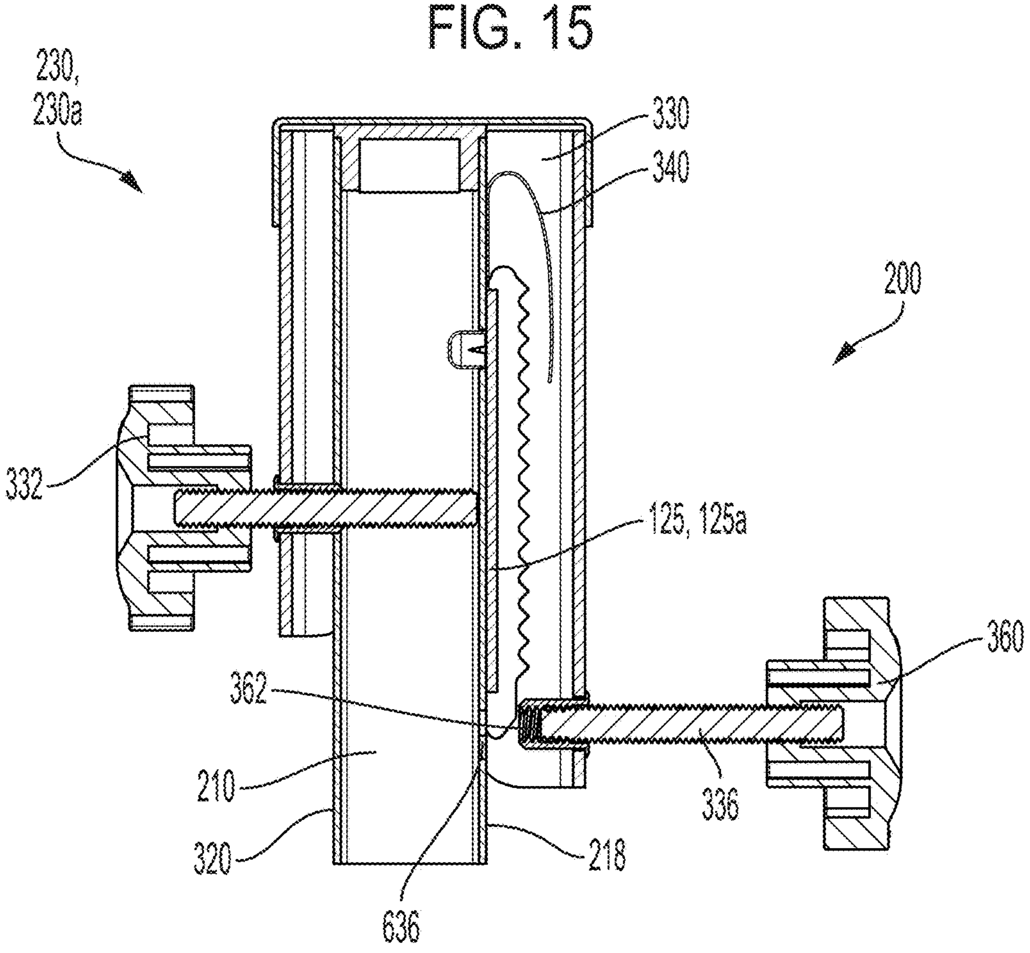
FIG. 16 is a cross-sectional view of the guardrail clamp assembly according to another aspect of the present disclosure, taken along a line similar to line 6-6 in FIG. 5.

FIG. 16 illustrates a cross-sectional view of the upper clamp assembly 230*a* coupled to the reinforcement post 210, in accordance with another example aspect of the present disclosure, taken along a line similar to line 6-6 in FIG. 5. The upper clamp assembly 230*a* and the reinforcement post 210 can be substantially similar to the upper clamp assembly 230*a* and the reinforcement post 210 previously described. However, in the present aspect, the reinforcement post assembly 200 does not comprise the guide rivet nut 640 (shown in FIG. 6) mounted within the front post opening 636 at the front post side 218 of the reinforcement post 210. According to example aspects, upon tightening the primary slot stop 360 to extend the threaded shaft 336 thereof through the front post opening 636, a clearance can be defined between the threaded shaft 336 of the primary slot stop 360 and the front post opening 636, thereby allowing the threaded shaft 336 to move easily within the front post opening 636. Furthermore, in some aspects, the threaded shaft 336 of the primary slot stop 360 can be sized such that the distal stop end 362 of the threaded shaft 336 can be spaced from the rear post side 320 of the reinforcement post 210 in the blocked position. In other aspects, the distal stop end 362 may contact the rear post side 320. Other aspects of the clamp assembly 230 may not comprise the front post opening 636, and the distal stop end 362 of the threaded shaft 336 can abut the front post side 218 in the blocked position.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A clamp assembly for a fall protection reinforcement post, the clamp assembly comprising:
- a clamp body at least partially defining a slot configured to receive a guardrail therethrough;
- a post fastener engaging the clamp body and configured to secure the clamp assembly to the fall protection reinforcement post;
- a slot stop engaging the clamp body and traversing a bottom slot end of the slot, the slot stop configured to prevent the guardrail from disengaging the slot at the bottom slot end; and
- a clamp spring biasing the clamp assembly to an untightened configuration;

wherein:
- the clamp body defines:
  - a front clamp wall configured to confront a front post side of the reinforcement post;
  - a rear clamp wall opposite the front clamp wall and configured to confront a rear post side of the reinforcement post;
  - a first clamp sidewall extending between the front clamp wall and the rear clamp wall; and
  - a second clamp sidewall extending between the front clamp wall and the rear clamp wall, opposite the first clamp sidewall;
- the slot is at least partially defined by the front clamp wall;
- the slot stop extends through the front clamp wall towards the rear clamp wall;
- each of the first clamp sidewall and the second clamp sidewall define a notch; and
- a forward edge of each notch at least partially defines the slot.

2. The clamp assembly of claim 1, wherein the post fastener extends through a rear clamp opening in the rear clamp wall towards the front clamp wall and is configured to engage the reinforcement post at the rear post side.

3. The clamp assembly of claim 2, wherein the post fastener is a threaded bolt fastener comprising a threaded shaft and an adjustment knob, the threaded shaft extending through the rear clamp opening.

4. The clamp assembly of claim 1, wherein the clamp spring is arranged within the slot and engages the front clamp wall, the clamp spring configured to bias the front clamp wall forwardly away from the front post side of the reinforcement post in the untightened configuration.

5. The clamp assembly of claim 4, wherein the clamp spring is a button spring clip comprising a substantially inverted V-shaped resilient spring portion and a button tab extending from the substantially inverted V-shaped resilient spring portion.

6. The clamp assembly of claim 5, wherein:
- the substantially inverted V-shaped resilient spring portion defines a first leg and a second leg;
- the first leg confronts an inner clamp wall surface of the front clamp wall;
- the second leg is configured to confront an outer post surface of the front post side; and
- the button tab extends from the second leg and is configured to engage a button opening formed through the front post side.

7. The clamp assembly of claim 1, wherein the slot stop is a threaded bolt fastener comprising a threaded shaft and an adjustment knob, the threaded shaft extending through a front clamp opening formed through the front clamp wall and configured to engage the reinforcement post at the front post side.

8. The clamp assembly of claim 1, wherein a plurality of gripping teeth are formed along the forward edge of each notch.

9. The clamp assembly of claim 1, wherein:
- the slot stop is a primary slot stop; and
- each of the first clamp sidewall and the second clamp sidewall define a secondary slot stop extending towards the rear clamp wall and at least partially traversing the slot.

10. The clamp assembly of claim 9, wherein each secondary slot stop is formed as a stop hook at a bottom wall end of the first clamp sidewall or the second clamp sidewall.

11. The clamp assembly of claim 1, further comprising a clamp end cap mounted to the clamp body at an upper clamp end of the clamp body.

12. The clamp assembly of claim 1, wherein the slot stop is vertically offset from the post fastener.

13. A reinforcement post assembly comprising:
- a fall protection reinforcement post defining a front post side and a rear post side; and
- a clamp assembly comprising:
  - a clamp body;
  - a post fastener engaging the clamp body and the reinforcement post to secure the clamp assembly to the reinforcement post; and
  - a clamp spring biasing the clamp assembly to an untightened configuration; and
- wherein:
  - a slot is defined between the clamp body and the front post side of the reinforcement post, the slot configured to receive a guardrail therethrough;
  - the clamp body defines a front clamp wall confronting the front post side and a rear clamp wall opposite the front clamp wall and confronting the rear post side;
  - the clamp spring is arranged within the slot between the front clamp wall and the front post side; and
  - the clamp spring is a button spring clip comprising a substantially inverted V-shaped resilient spring portion and a button tab extending from the substantially inverted V-shaped resilient spring portion.

14. The reinforcement post assembly of claim 13, further comprising a slot stop engaging the clamp body and traversing a bottom slot end of the slot, the slot stop configured to prevent the guardrail from disengaging the slot at the bottom slot end.

15. The reinforcement post assembly of claim 14, wherein:

the slot stop comprises a first threaded bolt fastener comprising a threaded shaft;

a first nut defining a threaded fastener bore is mounted to the reinforcement post at the front post side; and the threaded shaft of the first threaded bolt fastener engages the threaded fastener bore of the first nut.

16. The reinforcement post assembly of claim 15, wherein:

the post fastener comprises a second threaded bolt fastener comprising a threaded shaft;

a second nut defining a threaded fastener bore is mounted to the reinforcement post at the rear post side; and the threaded shaft of the second threaded bolt fastener engages the threaded fastener bore of the second nut.

17. The reinforcement post assembly of claim 16, wherein the slot stop is vertically offset from the post fastener.

18. The reinforcement post assembly of claim 13, wherein:

the substantially inverted V-shaped resilient spring portion defines a first leg and a second leg;

the first leg confronts an inner clamp wall surface of the front clamp wall;

the second leg confronts an outer post surface of the front post side; and the button tab extends from the second leg and engages a button opening formed through the front post side.

19. The reinforcement post assembly of claim 13, wherein:

the clamp body defines:

a front clamp wall confronting the front post side;

a rear clamp wall opposite the front clamp wall and confronting the rear post side;

a first clamp sidewall extending between the front clamp wall and the rear clamp wall; and a second clamp sidewall extending between the front clamp wall and the rear clamp wall, opposite the first clamp sidewall;

each of the first clamp sidewall and the second clamp sidewall define a notch; and a forward edge of each notch at least partially defines the slot.

20. A clamp assembly for a fall protection reinforcement post, the clamp assembly comprising:

a clamp body at least partially defining a slot configured to receive a guardrail therethrough;

a post fastener engaging the clamp body and configured to secure the clamp assembly to the fall protection reinforcement post;

a slot stop engaging the clamp body and traversing a bottom slot end of the slot, the slot stop configured to prevent the guardrail from disengaging the slot at the bottom slot end; and a clamp spring biasing the clamp assembly to an untightened configuration;

wherein:

the clamp body defines:

a front clamp wall configured to confront a front post side of the reinforcement post; and a rear clamp wall opposite the front clamp wall and configured to confront a rear post side of the reinforcement post;

the slot is at least partially defined by the front clamp wall;

the slot stop extends through the front clamp wall towards the rear clamp wall;

the clamp spring is arranged within the slot and engages the front clamp wall;

the clamp spring is configured to bias the front clamp wall forwardly away from the front post side of the reinforcement post in the untightened configuration; and the clamp spring is a button spring clip comprising a substantially inverted V-shaped resilient spring portion and a button tab extending from the substantially inverted V-shaped resilient spring portion.

21. The clamp assembly of claim 20, wherein:

the substantially inverted V-shaped resilient spring portion defines a first leg and a second leg;

the first leg confronts an inner clamp wall surface of the front clamp wall;

the second leg is configured to confront an outer post surface of the front post side; and the button tab extends from the second leg and is configured to engage a button opening formed through the front post side.

22. A reinforcement post assembly comprising:

a fall protection reinforcement post defining a front post side and a rear post side; and a clamp assembly comprising:

a clamp body;

a post fastener engaging the clamp body and the reinforcement post to secure the clamp assembly to the reinforcement post; and a clamp spring biasing the clamp assembly to an untightened configuration;

wherein:

a slot is defined between the clamp body and the front post side of the reinforcement post, the slot configured to receive a guardrail therethrough the clamp body defines:

a front clamp wall confronting the front post side;

a rear clamp wall opposite the front clamp wall and confronting the rear post side;

a first clamp sidewall extending between the front clamp wall and the rear clamp wall; and a second clamp sidewall extending between the front clamp wall and the rear clamp wall, opposite the first clamp sidewall;

each of the first clamp sidewall and the second clamp sidewall define a notch; and a forward edge of each notch at least partially defines the slot.

* * * * *